United States Patent
Liu et al.

(10) Patent No.: US 9,137,823 B1
(45) Date of Patent: Sep. 15, 2015

(54) DOWNLINK AND UPLINK STAGGERING TECHNIQUES WITH AID BITMAP SEGMENTATION

(75) Inventors: Yong Liu, Campbell, CA (US); Raja Banerjea, Sunnyvale, CA (US)

(73) Assignee: Marvell International Ltd., Hamilton (BM)

(*) Notice: Subject to any disclaimer, the term of this patent is extended or adjusted under 35 U.S.C. 154(b) by 546 days.

(21) Appl. No.: 13/477,575

(22) Filed: May 22, 2012

Related U.S. Application Data

(60) Provisional application No. 61/489,114, filed on May 23, 2011, provisional application No. 61/544,221, filed on Oct. 6, 2011, provisional application No. 61/560,707, filed on Nov. 16, 2011.

(51) Int. Cl.
| | | |
|---|---|---|
| *H04W 4/00* | (2009.01) | |
| *H04W 74/00* | (2009.01) | |
| *H04W 52/02* | (2009.01) | |

(52) U.S. Cl.
CPC ........ *H04W 74/006* (2013.01); *H04W 52/0216* (2013.01)

(58) Field of Classification Search
None
See application file for complete search history.

(56) References Cited

U.S. PATENT DOCUMENTS

| | | | |
|---|---|---|---|
| 7,664,089 | B2 | 2/2010 | Zhao |
| 7,710,930 | B2 | 5/2010 | Kwak |
| 8,036,241 | B2 | 10/2011 | Ji et al. |
| 8,045,574 | B2 | 10/2011 | Sherman et al. |
| 8,121,108 | B2 | 2/2012 | Kwon et al. |
| 8,265,061 | B1 | 9/2012 | Smith et al. |
| 8,355,389 | B2 | 1/2013 | Kasslin et al. |
| 8,411,699 | B2 | 4/2013 | Ohmi |
| 8,468,615 | B2 | 6/2013 | Tremp |
| 2003/0012163 | A1 | 1/2003 | Cafarelli et al. |
| 2004/0203979 | A1 | 10/2004 | Attar et al. |
| 2004/0218555 | A1 | 11/2004 | Chen et al. |
| 2005/0047386 | A1 | 3/2005 | Yi |

(Continued)

FOREIGN PATENT DOCUMENTS

| | | |
|---|---|---|
| EP | 1513295 A2 | 3/2005 |
| EP | 1553730 A1 | 7/2005 |

(Continued)

OTHER PUBLICATIONS

PCT International Search Report for related Application No. PCT/US2013/044473; Oct. 29, 2013; 5 pages.

(Continued)

*Primary Examiner* — Jutai Kao

(57) ABSTRACT

A system includes a medium access control device receiving data for N of M stations transmitted from an access point to the N stations. A multicast module determines whether the received data includes first data, and to which grouping(s) of the M stations the access point is to transmit the first data. A unicast module determines whether the received data includes second data, and to which ones of the N stations the access point is to transmit the second data. A bitmap module generates a PVB including a first identifier for the grouping(s) of the M stations and second identifiers for the ones of the N stations. A segmentation module generates segmentation information indicating whether to divide the PVB into fragments. A message control module transmits a TIM indicating bit states of the first identifier and the second identifiers to ones of the N stations based on the segmentation information.

23 Claims, 15 Drawing Sheets

(56) References Cited

U.S. PATENT DOCUMENTS

| | | |
|---|---|---|
| 2005/0105504 A1 | 5/2005 | Sakoda |
| 2006/0187964 A1 | 8/2006 | Li et al. |
| 2007/0025244 A1 | 2/2007 | Ayyagari et al. |
| 2007/0041353 A1 | 2/2007 | Li et al. |
| 2007/0076675 A1 | 4/2007 | Chen |
| 2007/0160021 A1 | 7/2007 | Xhafa et al. |
| 2007/0217378 A1 | 9/2007 | Moorti et al. |
| 2007/0280246 A1 | 12/2007 | Berkman et al. |
| 2007/0286222 A1 | 12/2007 | Balasubramanian |
| 2008/0144558 A1 | 6/2008 | Wentink |
| 2008/0146253 A1 | 6/2008 | Wentink |
| 2008/0151814 A1 | 6/2008 | Jokela |
| 2008/0240049 A1 | 10/2008 | Gaur |
| 2008/0247376 A1 | 10/2008 | Del Prado Pavon et al. |
| 2008/0310391 A1 | 12/2008 | Schneidman et al. |
| 2009/0010191 A1* | 1/2009 | Wentink ............. 370/311 |
| 2009/0016306 A1* | 1/2009 | Wang et al. ............. 370/338 |
| 2009/0109887 A1 | 4/2009 | Chandra et al. |
| 2009/0196163 A1 | 8/2009 | Du |
| 2009/0196212 A1 | 8/2009 | Wentink |
| 2010/0165973 A1 | 7/2010 | Su et al. |
| 2010/0192001 A1 | 7/2010 | Cornwall et al. |
| 2010/0278088 A1 | 11/2010 | Goldman |
| 2010/0309831 A1 | 12/2010 | Yeh et al. |
| 2010/0315999 A1 | 12/2010 | Kakani et al. |
| 2011/0026446 A1 | 2/2011 | Stacey |
| 2011/0122780 A1 | 5/2011 | Nieminen et al. |
| 2011/0176521 A1 | 7/2011 | Park et al. |
| 2011/0268054 A1 | 11/2011 | Abraham et al. |
| 2012/0106418 A1 | 5/2012 | Xhafa et al. |
| 2012/0120858 A1 | 5/2012 | Das et al. |
| 2012/0147800 A1 | 6/2012 | Park et al. |
| 2012/0159001 A1 | 6/2012 | Liu et al. |
| 2012/0219099 A1 | 8/2012 | Loukianov |
| 2012/0263094 A1* | 10/2012 | Wentink ............. 370/312 |
| 2012/0302184 A1 | 11/2012 | Zaitsu |
| 2012/0315943 A1 | 12/2012 | Chu et al. |
| 2013/0176902 A1 | 7/2013 | Wentink et al. |
| 2013/0258931 A1 | 10/2013 | Gonikberg et al. |
| 2014/0119268 A1 | 5/2014 | Chu et al. |
| 2014/0153463 A1 | 6/2014 | Park et al. |

FOREIGN PATENT DOCUMENTS

| | | |
|---|---|---|
| WO | WO-2008111496 A2 | 9/2008 |
| WO | WO-2012122119 A1 | 9/2012 |

OTHER PUBLICATIONS

International Preliminary Report on Patentability in Int'l App. No. PCT/US2012/034091, mailed Oct. 31, 2013.
Chen, "Home Network Basis: Transmission Environments and Wired/Wireless Protocols," Prentice Hall (Jul. 2003).
Hiertz, et al., "The IEEE 802.11 Universe," IEEE Communications Magazine, pp. 62-70, Jan. 2010.
Stacey et al., "IEEE P802.11, Wireless LANs, Proposed TGac Draft Amendment," Institute of Electrical and Electronics Engineers, doc. No. IEEE 802.11-10/1361 r3 (Jan. 2011).
Stacey et al., "Specification Framework for TGac," document No. IEEE 802.11-09/0992r20, Institute for Electrical and Electronics Engineers, pp. 1-49, Jan. 18, 2011.
IEEE Std 802.11 ac/D2.1 "Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," The Institute of Electrical and Electronics Engineers, Inc., Mar. 2012.
Perahia, et al., "Gigabit Wireless LANs: an overview of IEEE 802.11 ac and 80211 ad," ACM SIGMOBILE Mobile Computing and Communications Review, vo. 15, No. 3, pp. 23-33, Jul. 2011.
IEEE Std 802.11 af/D1.05 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: TV White Spaces Operation," The Institute of Electrical and Electronics Engineers, Inc., Nov. 2011.
Yu, et al. "Coverage extension for IEEE802.11 ah," The Institute of Electrical and Electronics Engineers, doc. No. IEEE 802.11-11/0035r1, (Jan. 2011).
Taghavi et al., "Introductory Submission for TGah", doc. No. IEEE 802.11-11/0062r0, Institute for Electrical and Electronics Engineers, pp. 1-5 (Jan. 14, 2011).
Zhang et al., "11 ah Data Transmission Flow," The Institute of Electrical and Electronics Engineers, doc. No. IEEE 802.11-11/1484r1, (Nov. 2011).
Vermani, et al. "Preamble Format for 1 MHz," The Institute of Electrical and Electronics Engineers, doc. No. IEEE 802.11-11/1482r2, (Nov. 2011).
Zhang et al., "1MHz Waveform in Wider BW", The Institute of Electrical and Electronics Engineers, doc. No. IEEE 802.11-12/0309r1, (Mar. 2012).
Vermani, et al. "Spec Framework Text for PHY Numerology," The Institute of Electrical and Electronics Engineers, doc. No. IEEE 802.11-11/1311 rO, (Sep. 2011).
Zhao, Liqiang et al.; Hybrid DCF Supporting Hybrid Antennas in a WLAN; IMACS Multiconference; Oct. 4-6, 2006.
ANSI/IEEE Std 802.11, 1999 Edition; Information technology—Telecommunications and information exchange between systems—Local and metropolitan area networks—Specific requirements—Part 11: Wireless LAN Medium Access Control (MAC) and Physical Layer (PHY) Specifications; LAN/MAN Standards Committee of the IEEE Computer Society; 528 pages.
Low Power Capability Support for 802.11ah dated Jan. 17, 2011.
U.S. Appl. No. 61/475,776 dated Apr. 15, 2011.
Park, Minyoung. "IEEE P802.11 Wireless LANs Proposed Specification Framework for TGah." TGac Spec Framework; Mar. 12, 2012; 13 pages.
Yong Liu; U.S. Appl. No. 13/680,831, filed Nov. 19, 2012, entitled "802.11 Enhanced Distributed Channel Access"; 47 pages.
Yong Liu; U.S. Appl. No. 13/680,876, filed Nov. 19, 2012, entitled "Restricted Access Window"; 53 pages.
PCT Internation Search Report and Written Opinon for related Application No. PCT/US2012/066246; Jan. 23, 2013; 5 pages.
Park, Miuyoung; IEEE P802.11; Jul. 2012; 32 pages.
Ghosh, Chittabrata et al.; Restricted Access Window Signaling for Uplink Channel Access; Jul. 16, 2012; 13 pages.
Liu, Siyang et al.; DCF Enhancements for Large Number of STAs; Sep. 15, 2011; 11 pages.
Revolution Wi-Fi The Wireless Professional's Connection for Independent Analysis; Wireless QoS Part 1—Background Information; Jul. 28, 2010; 11 pages.
Mangold, Stefan et al.; IEEE 802.11e Wireless LAN for Quality of Service; 2002; 8 pages.
Multi-Rate Layered Decoder Architecture for Block LDPC Codes of the IEEE 802.11n Wireless Standard; Kiran Gunnam, Gwan Choi, Weihuang Wang, and Mark Yeary; © 2007 IEEE. (4 pages).
IEEE Standard for Information technology—Telecommunications and information exchange between systems Local and metropolitan area networks-Specific requirements Part 11: Wireless LAN Medium Access Control (MAC) and Physical Layer (PHY) Specifications; Copyright © 2012 by The Institute of Electrical and Electronics Engineers, Inc.; Mar. 29, 2012; 2,793 pages.
de Vegt, Rolf; Potential Compromise for 802.11ah Use Case Document; IEEE 802.11-11/0457r0; Mar. 2011; 27 pages.
IEEE P802.11ac/D2.0 Draft Standard for Information Technology Telecommunications and information exchange between systems—Local and metropolitan area networks—Specific requirements, Part 11: Wireless LAN Medium Access Control (MAC) and Physical Layer (PHY) specifications, Amendment 5: Enhancements for Very High Throughput for Operation in Bands below 6 GHz, Jan. 2012, 359 pages.
IEEE Std 802.11a-1999 (Supplement to IEEE Std 802.11-1999) "Supplement to IEEE Standard for Information technology—Telecommunications and information exchange between systems—Lo-

(56) References Cited

OTHER PUBLICATIONS cal and metropolitan area networks—Specific requirements—Part11: Wireless LAN Medium Access Control (MAC) and Physical Layer (PHY) specifications: Hiqh-Speed Physical Laver in the 5 GHZ Band," *The Institute of Electrical and Electronics Engineers, Inc.*, (1999).

IEEE Std 802.11b-1999/Cor Jan. 2001 (Corrigendum to IEEE Std 802.11 b-1999) "IEEE Standard for Information technology—Telecommunications and information exchange between systems—Local and metropolitan area networks—Specific requirements, Part11: Wireless LAN Medium Access Control (MAC) and Physical Layer (PHY) specifications, Amendment 2: Higher-speed Physical Layer (PHY) extension in the 2.4 GHz band-Corrigendum 1 ," *The Institute of Electrical and Electronics Engineers, Inc.*, Nov. 7, 2001.

IEEE Std 802.11g/D8.2, Apr. 2003 (Supplement to ANSI/IEEE Std 802.11, 1999 (Reaff 2003)) "Draft Supplement to Standard [for] Information technology—Telecommunications and information exchange between systems—Local and metropolitan area networks—Specific requirements, Part 11: Wireless LAN Medium Access Control (MAC) and Physical Layer (PHY) specifications: Further Higher Data Rate Extension in the 2.4 GHz Band," *The Institute of Electrical and Electronics Engineers, Inc.*, Apr. 2003.

International Standard, ISO/IEG 8802-11, ANSI/IEEE Std 802.11, "Information technology—Telecommunications and information exchange between systems—local and metropolitan area networks—specific requirements" Part 11: Wireless LAN Medium Access Control (MAC) and Physical Layer (PHY) specifications, *The Institute of Electrical and Electronics Engineers, Inc,.* (1999).

IEEE Std 802.11-2007 (revision of IEEE Std. 802.11-1999) "Information Standard for Information technology—Telecommunications and information exchange between systems—Local and metropolitan area networks—Specific requirements" Part 11: Wireless LAN Medium Access Control (MAC) and Physical Layer (PHY) Specifications, *The Institute of Electrical and Electronics Engineers, Inc.*, (Jun. 12, 2007).

IEEE Std. 802.11n "IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancements for Higher Throughput," *The Institute of Electrical and Electronics Engineers, Inc.*, Oct. 2009.

International Search Report and Written Opinion in International Application No. PCT/US2012/034091 dated Nov. 27, 2012.

* cited by examiner

DOWNLINK AND UPLINK STAGGERING TECHNIQUES WITH AID BITMAP SEGMENTATION

CROSS-REFERENCE TO RELATED APPLICATIONS

This disclosure claims the benefit of U.S. Provisional Application No. 61/489,114, filed on May 23, 2011, U.S. Provisional Application No. 61/544,221, filed on Oct. 6, 2011, and U.S. Provisional Application No. 61/560,707, filed on Nov. 16, 2011. The disclosures of the above applications are incorporated herein by reference in their entirety.

FIELD

The present disclosure relates to local area network communication systems, and more particularly to network channel access control systems.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

A network can be formed by an access point and multiple stations (or network devices) in communication with the access point. Communications between the access point and the multiple stations can occur during one or more uplink periods and one or more downlink periods. For example, during an uplink period, a station may transmit data to the access point; and during a downlink period, a station may receive data from the access point. An access point may periodically transmit beacons to inform a station of various communication-related information—including, for example, i) when the access point has data for the stations, ii) when data is to be transmitted from the access point to the stations, and/or iii) when the stations may transmit data to the access point.

Each of the beacons may include a traffic information message (TIM) and/or a delivery traffic information message (DTIM). TIMs are transmitted to the stations to indicate when unicast, broadcast and multicast data is buffered to be transmitted from the access point to the stations. A DTIM is a special TIM. DTIMs not only indicate buffered unicast, multicast and/or broadcast data information, but also signal that the buffered multicast data and/or broadcast data is to be transmitted subsequent to beacons that carry the DTIM. The DTIMs may be transmitted less frequently than the TIMs.

Each station in a network or basic service set (BSS) may "wake" from a power save mode prior to a time when a DTIM is expected to be transmitted from and/or received by an access point. This allows the stations to determine whether the access point is to transmit multicast data or broadcast data for the BSS, a multicast group and/or a broadcast group in which the stations are assigned. Each station in a network may not wake for each transmitted TIM. Each station may wake for assigned TIMs and remain in a power save mode for other TIMs. This allows the stations to remain in a power save mode for increased periods of time.

An access point configured to satisfy traditional Institute of Electrical and Electronics Engineers (IEEE) 802.11 standards may support up to 2007 power saving (PS) stations for a single channel. According to 802.11, a single channel may have a bandwidth of 20 MHz or 40 mega-hertz (MHz). According to IEEE 802.11ah, a station may have a channel bandwidth of 1 or 2 MHz. IEEE 802.11ah requires that an access point support 6000 or more stations in a single channel. This requirement is introduced for "smart grid" applications. A "smart grid" application refers to an application that includes a network with 6000 or more stations, which are located in residential homes and/or business facilities with associated power meters. Although an increase in the number of stations supported by an access point provides increased network coverage per access point, the increased support can result in increased beacon duration times and/or cause channel congestion and increased channel access delays.

SUMMARY

A system is provided and includes a medium access control device configured to receive data for N of M stations. The received data is to be transmitted from an access point to the N stations. The M stations are associated with the access point, and where N is greater than or equal to one and is less than or equal to M. The medium access control device includes a multicast module configured to (i) determine whether the received data includes first data, and (ii) determine to which one or more groupings of the M stations the access point is to transmit the first data. A unicast module is configured to (i) determine whether the received data includes second data, and (ii) determine to which ones of the N stations the access point is to transmit the second data. A bitmap module is configured to generate a partial virtual bitmap including (i) at least one first identifier for the one or more groupings of the M stations, and (ii) second identifiers for the ones of the N stations. A segmentation module is configured to generate segmentation information indicating whether to divide the partial virtual bitmap into multiple fragments. A message control module is configured to transmit at least one traffic information message to one or more of the N stations based on the segmentation information. The traffic information message indicates bit states of the at least one first identifier and the second identifiers.

In other features, a system is provided and includes a medium access control device configured to receive data for N of M stations. The received data is to be transmitted from an access point to the N stations. The M stations are associated with the access point, where N is greater than or equal to two and is less than or equal to M. A bitmap module is configured to generate a partial virtual bitmap including (i) at least one first identifier for one or more groupings of the M stations, and (ii) second identifiers for the N stations. A segmentation module is configured to generate segmentation information indicating whether to divide the partial virtual bitmap into fragments. A message control module is configured to (i) generate traffic information messages based on the segmentation information, and (ii) distribute the fragments to the traffic information messages to stagger at least one of downlink times and uplink times of the N stations. One of the traffic information messages indicates a bit state of the at least one first identifier. Each of the traffic information messages indicates bit states of a respective portion of the second identifiers.

In other features, a system is provided and includes a medium access control device configured to receive traffic information messages transmitted from an access point to N of M stations. The M stations are associated with the access point. One of the N stations includes the medium access control device, where N is greater than or equal to two and is less than or equal to M. A control module is configured to transition to an active mode prior to receiving the traffic information messages based on downlink times indicated in a beacon signal received from the access point. A poll module is configured to generate trigger signals in response to receiving the traffic information messages. A monitoring module is configured to monitor fragments of a partial virtual bitmap received in the traffic information messages to determine whether the access point has data for the one of the N stations. A downlink module is configured to determine transmit times of the traffic information messages for multicast data, broadcast data, or unicast data, wherein the multicast data, broadcast data, or unicast data (i) is for the one of the N stations, and (ii) is indicated by bits in the partial virtual bitmap.

In other features, a system is provided and includes a medium access control device configured to assign N stations to M groups, where each of the M groups comprises at least one of the N stations. One of the M groups comprises P sets of stations, where P is an integer greater than one. The M groups are associated with an access point. An uplink module is configured to determine uplink times for the P sets of stations. A downlink module is configured to determine downlink times for the P sets of stations. A message control module is configured to transmit traffic information messages to the P sets of stations based on the uplink times and the downlink times. Each of the traffic information messages includes (i) a group index identifying the one of the M groups, (ii) a set bitmap indicating at least one set of the P sets of stations is granted access to a channel, (iii) a set offset value indicating a first one of the P sets of stations, and (iv) a set range value indicating the value P.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein.

DESCRIPTION

Techniques disclosed herein may be implemented to satisfy IEEE 802.11ah requirements. The techniques may be used to, for example, allow an access point to support 6000 or more stations in a single channel while minimizing beacon duration times. In addition, downlink and uplink staggering techniques are also disclosed to minimize congestion and access delays.

Figure 1:
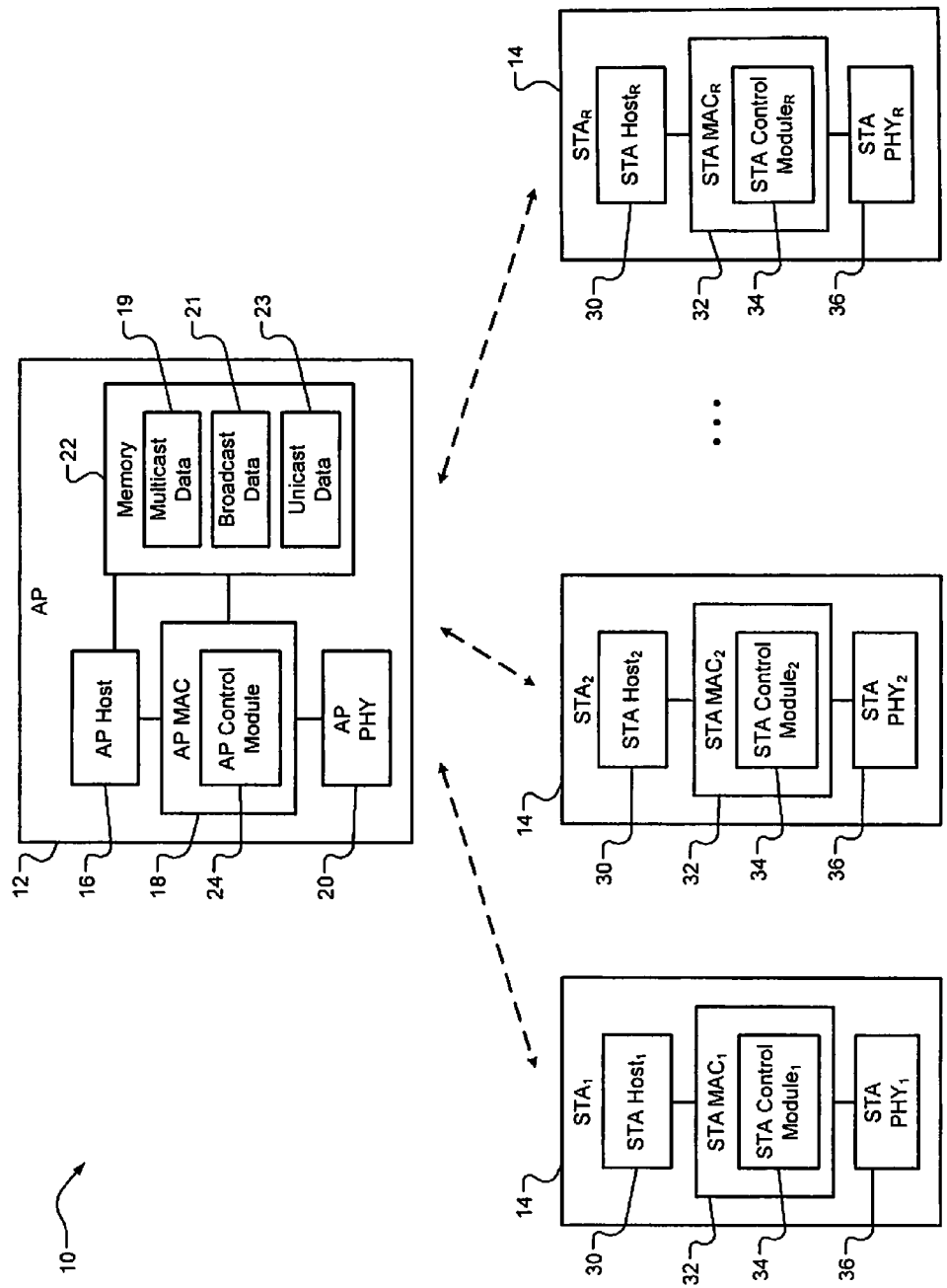
FIG. 1 is a functional block diagram of a communication system in accordance with the present disclosure.

FIG. 1 illustrates a communication system 10 including one or more network(s). One or more of the network(s) may be, for example, a wide area network (WAN), a local area network (LAN), or a wireless local area network (WLAN). The communication system 10 includes one or more access points (one access point 12 is shown) and a plurality of stations 14 (stations $STA_1$-$STA_R$ are shown). In one example, the number of stations 14 within the communication system 10 can be in the range of 6,000. The stations 14 can each be assigned to a group, a sub-group, a set, and/or a sub-set of stations (referred to herein as groupings of stations) by one of the access points (APs), as further described below. Each AP can communicate with the stations 14 using a single channel having i) one or more frequencies and ii) a bandwidth of, for example, 1-2 MHz.

The AP 12 includes an AP host 16, an AP medium access control (MAC) device 18 and an AP physical layer (PHY) device 20. The AP host 16 can be an AP control module, a computer, or other suitable module, which may receive and/or provide frames of data (referred to as buffered units (BUs)) to the AP MAC device 18. In one implementation, the data is stored in a memory 22 of the AP 12 and is accessible to the AP host 16 and the AP MAC device 18. The data can include multicast data 19, broadcast data 21, and/or unicast data 23. Multicast data refers to data that is to be transmitted to two or more of the stations 14. Broadcast data refers to data that is to be transmitted to each station in a network of the stations 14. The AP 12 can group the stations 14 into multiple networks, where each network has one or more of the stations 14. Unicast data refers to data that is to be transmitted to a single one of the stations 14.

The AP MAC device 18 and the AP PHY device 20 may correspond to, for example, layers in an open systems interconnection (OSI) model of a communication system within the AP 12. The AP MAC device 18 includes an AP control module 24. The AP control module 24 generates beacons. Each of the beacons can include a group information message, a traffic information message (TIM) and/or a delivery traffic information message (DTIM). The AP control module 24 can provide the messages in various formats to the stations 14 using techniques disclosed herein. The AP control module 24 can also perform downlink and uplink staggering, which is further described below.

Each of the stations 14 can include a station host 30, a station MAC device 32 with a station control module 34 and a station PHY device 36. The station host 30 can be a station control module, a computer, or other suitable module, which may receive and/or provide frames of data to the station MAC device 32. The station PHY devices 36 communicate with the AP PHY device 20. In one implementation, the station control module 34 is configured to operate in an active mode and a standby (or sleep) mode. The station control module 34 can control which devices of the station 14 are fully powered, partially powered, and/or powered down during the standby mode. During the active mode, the station control module 34, the station MAC device 32 and/or the station PHY device 36 may be fully powered to receive a beacon from the AP 12. During the standby mode, the station control module 34, the station MAC device 32 and/or the station PHY device 36 may be partially or fully powered down.

The station control modules 34 can determine when to operate in the active mode based on previously received beacon information. In one implementation, the beacon information indicates to the stations 14 whether the AP 12 has buffered unicast, multicast, and/or broadcast data to transmit to the stations 14. Each of the stations 14 may transition to the active mode when that station is expected to receive data from the AP 12 or when the station has uplink data to transmit to the AP.

Each of the stations 14 may transition to the active mode prior to each DTIM to determine whether there is buffered unicast, multicast and/or broadcast data for the station. Stations expected to receive any buffered unicast, multicast and/or broadcast data may remain in the active mode to receive the buffered data subsequent to the DTIM. Subsequent to receiving the buffered data, the stations 14 may return to the standby mode.

Each of the stations 14 may also transition to the active mode prior to associated TIMs and not transition to the active mode for TIMs, which are not associated with that station. For example, an AP 12 may transmit 9 TIMs between each pair of sequential DTIMs. A station may be assigned to a third one of the nine TIMs. The station may transition to the active mode prior to the third TIM to receive unicast data and then return to the standby mode if the AP 12 no longer has data to transmit to the station.

Each TIM may indicate whether the AP 12 has buffered unicast, multicast and/or broadcast data to transmit to each of the stations 14. Each DTIM may indicate whether the AP 12 has buffered unicast, multicast and/or broadcast data to transmit to each of the stations 14 and signal that the buffered multicast and/or broadcast data is to be transmitted subsequent to beacons carrying the DTIM. Each DTIM may have a similar format as each TIM. The DTIMs and the TIMs may each or collectively include, for example, one or more partial virtual bitmaps (PVBs) and/or one or more fragments of a PVB. The PVBs include bits corresponding to the stations 14. The bits indicate whether the AP 12 has buffered data to transmit to each of the stations 14. Each bit may be assigned to a respective one of the stations 14 and indicate whether the AP 12 has buffered data for that station. The DTIMs and TIMs may include group bits, where each group bit is assigned to a particular group of the stations 14 and indicates whether the AP 12 has multicast or broadcast data for that group.

Figure 2:
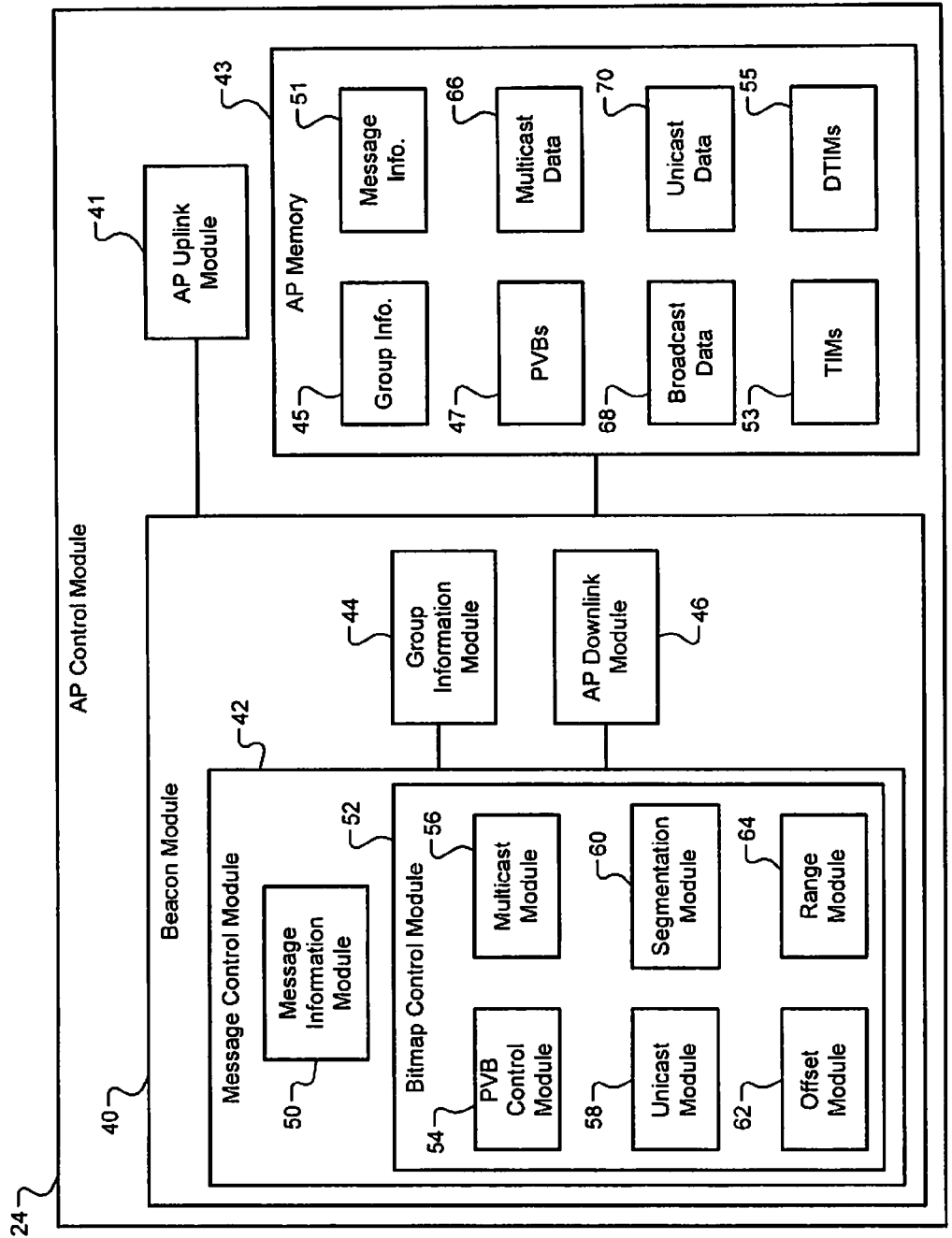
FIG. 2 is a functional block diagram of an access point control module in accordance with the present disclosure.

Referring now also to FIG. 2, the AP control module 24 is shown. The AP control module 24 may include a beacon module 40, an uplink module 41 and memory 43. The beacon module 40 generates and periodically transmits beacons. The beacon module 40 may include a message control module 42, a group information module 44, and an AP downlink module 46. The message control module 42 controls generation of TIMs and DTIMs. The group information module 44 may determine group information 45 not determined by the message control module 42. Group information 45 may include various parameters describing groupings of the stations 14 and/or associate identifiers (AIDs) and segmentation information of PVBs 47. Various AIDs and segmentation information are disclosed below. The message control module 42 and/or the downlink module 46 control downlink times of the stations 14 associated with the AP 12. A station is associated with an AP when the station is in the same network as the AP and is recognized by the AP as being in the network. The message control module 42 and/or downlink module 46 may determine downlink times for the stations 14 based on an amount of traffic currently experienced and/or to be experienced by a channel between the AP 12 and the stations 14. Various downlink and uplink staggering techniques are described below.

The message control module 42 includes a message information module 50 and a bitmap control module 52. The message information module 50 determines message information 51 included in TIMs 53 and DTIMs 55. The message information 51 may include fields such as an element identifier (ID), one or more length, DTIM or TIM counts, DTIM or TIM periods, offset values, range values, and/or other bitmap information. Each of these fields is described in detail with respect to the following figures.

The bitmap control module 52 may include a PVB control module 54, a multicast module 56, a unicast module 58, a segmentation module 60, an offset module 62, and a range module 64. The PVB control module 54 controls the generation of the PVBs 47 based on information from the modules 56-64. The multicast module 56 determines groups, sets, and/or subsets for which the AP 12 has buffered multicast and/or broadcast data. A group may include one or more sets of the stations 14. A set may include one or more subsets of the stations 14. A subset may include one or more of the stations 14. The unicast module 58 may determine for which ones of the stations 14 the AP 12 has buffered unicast data.

The segmentation module 60 determines how to segment one or more of the PVBs 47 into one or more of the TIMs 53, one or more of the DTIMs 55, and/or one or more report sections of a TIM and/or a DTIM. Example report sections are shown in FIG. 11. A TIM and a DTIM may each have one or more report sections. Each report section may include one or more fragments of a PVB. This is further described with respect to at least FIGS. 8-11.

The offset module 62 determines offset values for the PVBs 47. An offset value may, for example, identify a first block of unicast AIDs in a PVB that includes a '1' bit. The range module 64 determines range values associated with each offset value. A range value may provide, for example, a length associated with a range, where the range starts with a first block of unicast AIDs and has a '1' bit and ends with a last block in the PVB that includes a '1' bit.

The AP memory 43 may store the group information 45, the PVBs 47, the message information 51, multicast data 66, broadcast data 68, and unicast data 70. The group information 45, PVBs 47, and message information 51 may be stored in respective tables. The memory 43 may also store the TIMs 53 and the DTIMs 55 and/or the TIMs 53 and the DTIMs 55 may be generated prior to transmission and discarded subsequent to transmission.

The AP uplink module 41 may determine uplink times for the stations 14. The uplink time may be determined based on an amount of traffic currently experienced and/or to be experienced by the channel. The AP uplink module 41 may stagger uplink times of the stations 14 to minimize congestion and access delays. In one implementation, uplink staggering is provided based on downlink staggering, as described below.

Figure 3:
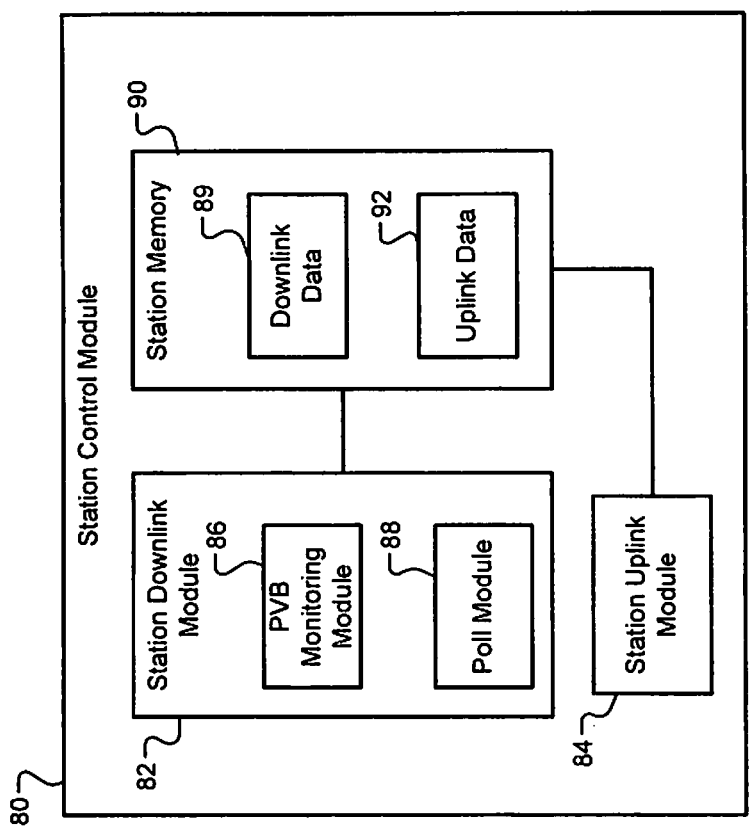
FIG. 3 is a functional block diagram of a station control module in accordance with the present disclosure.

Referring now also to FIG. 3, a station control module 80 is shown. The station control module 80 may replace one of the station control modules 34 of FIG. 1. The station control module 80 may include a station downlink module 82 and an uplink module 84. The station downlink module 82 may include a PVB monitoring module 86 and a poll module 88. The PVB monitoring module 86 may scan TIMs and DTIMs received in beacons transmitted from the AP 12 to a station of the station control module 80 for various TIM, DTIM and group information. The TIM, DTIM and group information may include parameters, such as identifiers, lengths, counts, periods, offsets, ranges, AID data status bits (hereinafter referred to as AID bits), and other parameters, which are described below with respect to the following figures. The station downlink module 82 may determine downlink times allocated to the station based on the TIM, DTIM and group information received in beacons, DTIMs and TIMs.

The poll module 88 generates poll (or trigger) signals, which are sent to the AP 12 when the AP 12 has downlink data 89 to send to the station. For example, the PVB monitoring module 86 may scan a PVB received in a DTIM from the AP 12 and determine that the AP 12 has unicast data to send to the station. The station may then send a poll signal to the AP 12 indicating that the station is in an active mode and ready to receive the downlink data. The station downlink module 82 may store the downlink data 89 in a station memory 90.

The station uplink module 84 may determine uplink times allocated to the station based on the TIM, DTIM and group information received in beacons, DTIMs and TIMs. The uplink times may be determined based on the downlink times and/or based on a lack of downlink and/or uplink times in the TIM, DTIM and group information. The station may send uplink data 92 to the AP 12 during: assigned uplink times; based on a priority level of the uplink data 92; default times; and/or at any time, as further described below. The station uplink module 84 may store the uplink data 92 in the station memory 90.

Figure 4:
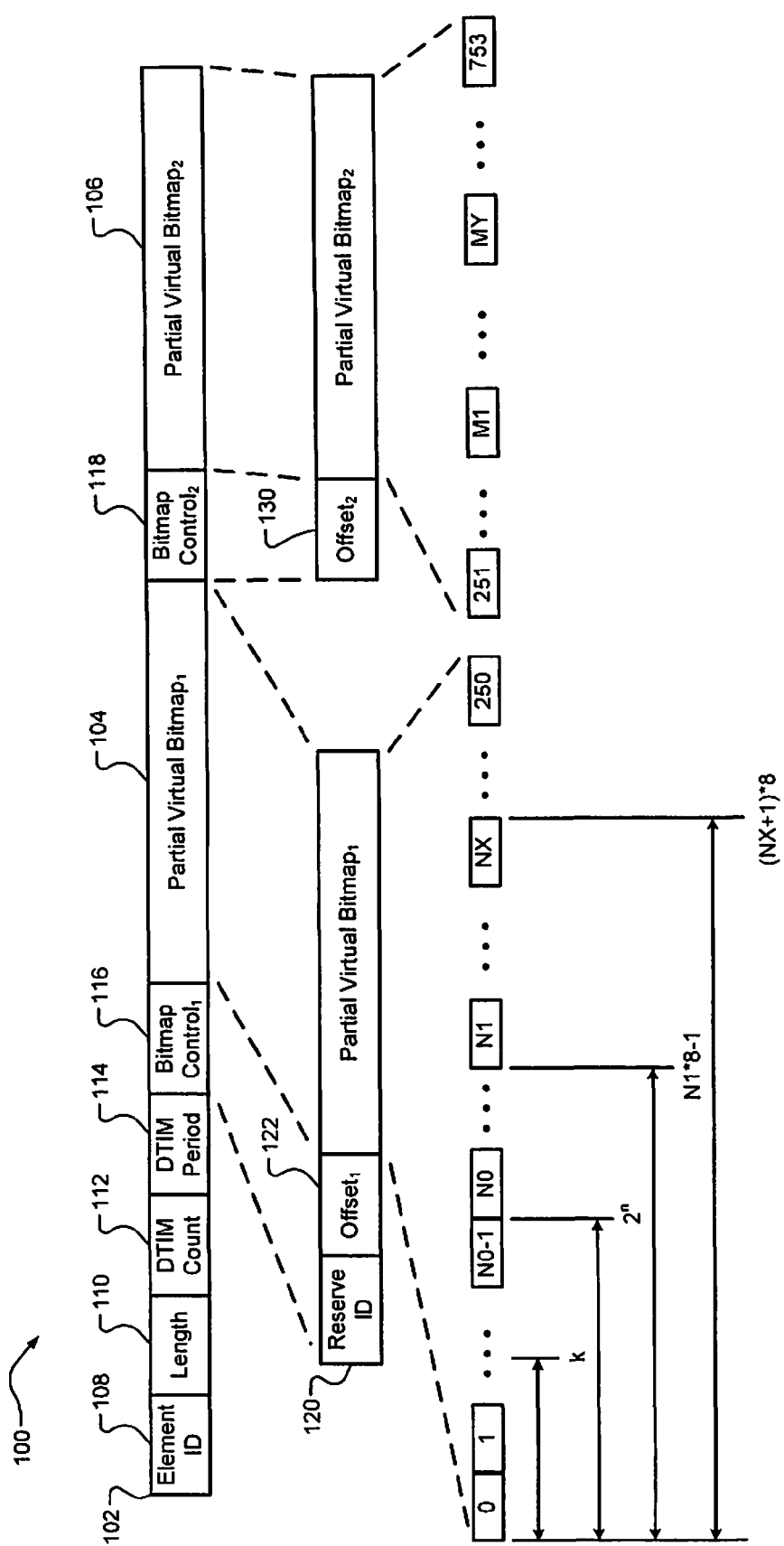
FIG. 4 is a traffic information message diagram illustrating use of a single basic service set identifier (BSSID) and multiple partial virtual bitmaps in accordance with the present disclosure.

In FIG. 4, a TIM diagram 100 is shown illustrating use of a single basic service set identifier (BSSID) and multiple PVBs. The TIM diagram 100 includes a TIM 102, which may be a DTIM. The TIM 102 includes multiple information fields, a first PVB 104, and a second PVB 106. The PVBs 104, 106 may be fragments of a single PVB. The information fields include an element identifier (ID) 108, a length 110, a DTIM count 112, a DTIM period 114, a first bitmap control field 116, a second bitmap control field 118. The element ID 108 indicates an ID of the TIM 102. A beacon or series of beacons may have multiple TIMs.

In general, a length field indicates a length associated with bits of one or more PVBs. The length 110 is measured from a first block having a bit of '1' to a last block having a bit of '1'. In the example shown, the length 110 may indicate a length associated with bits in the PVBs 104, 106 and the second bitmap control field 118. The PVBs 104, 106 may include blocks 0 to 753. Each block may include 1 byte or 8 bits. Each bit may refer to an AID and/or a number of each bit may be the AID for that bit. The AIDs may be group AIDs, unicast AIDs, or other AIDS, as further described below.

The length 110 does not account for an initial series of '0' bits and an ending series of '0' bits, as these series of bits may not be included in the PVBs 104, 106. Blocks 0 to N1 may be an initial series of '0' bits. Blocks 0 to N1−1 may be an initial series of '0' bits if (i) the AP 12 of FIG. 1 does not have multicast or broadcast data to send (indicated by multicast and/or broadcast AID bits of blocks 0 to N0−1 being set to '0'), and (ii) unicast AID bits of blocks N0 to N1−1 are set to '0'. Blocks MY+1 to 753 may be an ending series of '0' bits. In this example, the length 110 is equal to MY−N1+4, where block N1 is a first block that has a '1' bit and block MY is a last block that has a '1' bit. The length 110 may account for the length of the DTIM count 112, the DTIM period 114, and the bitmap control fields 116, 118 as a result, 5 is added to the difference MY−N1. If there is multicast or broadcast data, then the length 110 may be MY+5 when, for example a group associated with block 0 is to receive data. The length 110 may also be adjusted based on whether one of the blocks 0 to N1−1 has a bit set to '1'.

As another example, the length 110 may indicate simply the length of the first PVB 104, which is equal to: NX−N1+4 when blocks 0 to N1−1 are set to '0'; and to NX+4 when, for example, a bit in block 0 is set to '1'. The length does not include blocks NX+1 to 250, as these bits may not be included in the first PVB 104. Although a single length field is shown, additional length fields may be included to indicate lengths of additional PVBs.

The DTIM count field 112 indicates how many beacon frames (including a current frame) are to occur before a next DTIM. A DTIM count of 0 indicates that a current TIM is a DTIM. The DTIM count field 112 is a single octet. The DTIM count 112 may be indicative of when stations in a network should transition to the active mode to receive multicast and/or broadcast data. The DTIM count 112 may be indicative of a number of DTIMs until the stations should wake up. In one implementation, all stations transition to the active mode prior to a DTIM. In another implementation, each DTIM has one or more associated groups of stations and the groups of stations transition to the active mode prior to their respective DTIMs. Blocks 0 to N0−1 may indicate the groups of stations that the AP 12 has data to send. The groups of stations for which the AP 12 has data to send may remain in the active mode to receive multicast or broadcast data or may return to the standby mode and awake prior to the appropriate DTIM. Additional fields may be provided in a beacon, a DTIM and/or a TIM to indicate when each group of stations should transition to the active mode. The fields may indicate prior to which DTIM(s) each group of stations should transition to the active mode and listen for and receive multicast and/or broadcast data. The DTIM period field indicates the number of beacon intervals between successive DTIMs. If all TIMs are DTIMs, the DTIM period field has the value 1. A DTIM period value of 0 is reserved. The DTIM period field is a single octet. The DTIM period 114 may be indicative of a DTIM interval or time between DTIMs.

Each TIM includes a DTIM count and a DTIM period to indicate a duration (e.g. number of beacon intervals) to the next DTIM and the DTIM interval. A TIM count and a TIM interval may not be provided when there is a single group. When there are multiple groups, a TIM count and a TIM interval may be provided to indicate a duration (e.g. number of beacon intervals) to a next TIM belonging to the same group and a TIM interval of a that group.

The first bitmap control field 116 may be 1 byte (or octet) in length and include a primary group multicast/broadcast indication 120 and a first offset 122. The first group of stations may be referred to as a primary group and have a primary BSSID (referred to as a transmitted BSSID). The blocks 0 to N0−1 may be reserved for multicast and broadcast indications for non-primary groups. Each bit in each of the blocks 0 to N0−1 may be associated with one of the non-primary groups. Bit 1 of block 0 may be reserved or used for a special group or special indication. Each station in the primary group may check the reserve ID 120 to see if there is multicast or broadcast data for the primary group. Each station in a non-primary group may check the associated group multicast/broadcast indication bit (referred to as non-transmitted BSSIDs) in blocks 0 to N0−1 to determine whether the AP 12 has data for that group.

The first offset 122 may indicate a number (or AID) of block N1 (e.g., block 30) in the first PVB 104. Block N1 includes the first AID in the first PVB 104 for which the AP 12 has data to send to the associated STA. The block NX includes the last AID in the first PVB 104 for which the AP 12 has data to send to the associated STA, where X is the number of blocks included in the range of blocks N1 to NX. The numbers of N1 and NX may change for each DTIM and/or TIM depending upon which AIDs the AP 12 has data to send. Each bit in each of the blocks from N1 to 250 may remain associated with the same station AID. As a result, the number of blocks included in the range of blocks N1 to NX may change and the relationship of the range of blocks N1 to NX relative to the range of blocks N1 to 250 may change, but the association between each bit in the blocks N1 to 250 and the stations may not change. The first offset 122 may include 7 bits and be equal to a difference of N1-N0 divided by 2. As there are 7 bits in the first offset 122, the first offset 122 may represent $2^7$ or 128 bits. As a result, the resolution of the first offset 122 is 2.

The first PVB 104 may include, for example, blocks 0-250. Although the first PVB 104 is shown as having 250 blocks, the first PVB 104 may have a different number of blocks. Each block may include 1 byte (or 8 bits) or another suitable amount of bits and/or bytes. Although not shown in FIG. 4, the TIM 102 may include another field to indicate the amount of bits and/or bytes when each of the blocks does not include 1 byte. Blocks 0 to N0−1 may be reserved for multicast and broadcast indications for non-primary groups (or group AIDs). Although FIGS. 3-8 are primarily described with respect to BSSIDs and group AIDs for group blocks, such as blocks 0 to N0−1, the group blocks may be assigned to sets or subsets and have associated set AIDs and subset AIDs. If a bit in one of the blocks 0 to N0−1 is set to '1', then the AP 12 has buffered data to send to the group having a BSSID assigned to that bit. If the bit is set to '0', then the AP 12 does not have buffered data to send to the group.

Each station assigned to the first PVB 104 may have an AID and a corresponding AID bit in one of the blocks N0 to 250. If a bit in one of the blocks N0 to 250 is set to '1', then the AP 12 has buffered data to send to the station having an AID assigned to that bit. If the bit is set to '0', then the AP 12 does not have buffered data to send to the station.

A certain number of blocks k1 of the first PVB 104 may be actually used for multicast and/or broadcast groups. The number of blocks reserved for multicast and/or broadcast groups may be equal to $2^n$, where n is an integer. Bits 0 to ($2^n-1$) of the first PVB 104 may be reserved for multicast and broadcast groups. A length of the first PVB 104 from block 0 to N1 is equal to (N1*8)−1, where N1 may be a largest even number such that blocks numbered 1 through (N1*8)−1 in the bit map do not have a '1' bit. A length of the first PVB 104 from block 0 to NX is equal to (NX+1)*8, where blocks NX+1 to 250 do not include a '1' bit.

The second bitmap control field 118 may include a second offset 130, which may indicate a number (or AID) of block M1 (e.g., block 290) in the second PVB 106. This indicates the first AID in the second PVB 106 for which the AP 12 has data to send. The block MY identifies a last one of the AIDS in the second PVB 106 for which the AP 12 has data to send, where Y is the number of blocks in the range of blocks M1 to MY. Not all bits in blocks M1 to MY may be set to '0'. The numbers of M1 and MY may change for each DTIM and/or TIM depending upon which AIDS the AP 12 has data to send and are in the second PVB 106. Each bit in each of the blocks M1 to 753 may remain associated with the same station AID. As a result, the number of blocks included in the range of blocks M1 to MY may change and the relationship of the range of blocks M1 to MY relative to the range of blocks M1 to 753 may change, but the association between each bit in the blocks M1 to 753 and the stations may not change. The second offset 130 may include 7 bits and be equal to the number of M1 divided by 2. As there are 7 bits in the second offset 130, the second offset 130 may represent $2^7$ or 128 bits. As a result, the resolution of the second offset 130 is 2.

The second PVB 106 may include, for example, blocks 251-753. Although the second PVB 106 is shown as having blocks 251-753, the second PVB 106 may have a different range and/or number of blocks. Each bit in the second PVB 106 may be associated with a different group and/or station than the bits in the first PVB 104. Groups associated with the second PVB 106 may include stations in the groups of the first PVB 104 or may be exclusive of the groups of the first PVB 104. Each block of the second PVB 106 may include 1 byte (or 8 bits) or another suitable amount of bits and/or bytes. Although not shown in FIG. 4, the TIM 102 may include another field to indicate the amount of bits and/or bytes when each of the blocks does not include 1 byte. This field may be the same as or in addition to the field provided for the number of bits and/or blocks in the first PVB 104. Blocks 251 to M1 may be buffer blocks between the second offset 130 and the second PVB 106. Each station assigned to the second PVB 106 may have an AID and a corresponding AID bit in one of the blocks M1 to 753. If a bit in one of the blocks M1 to 753 is set to '1', then the AP 12 has buffered data to send to the station having an AID assigned to that bit. If the bit is set to '0', then the AP 12 does not have buffered data to send to the station. Although shown as separate PVBs, the first PVB 104 and the second PVB 106 may be segmented fragments of a single PVB.

A certain number of blocks k2 of the second PVB 106 may be actually used at a current point in time for multicast and/or broadcast groups. The number of blocks reserved for multicast and/or broadcast groups may be equal to $2^m$, where m is an integer. Bits 251 to ($2^m-1$) of the second PVB 106 may be reserved for multicast and/or broadcast groups. A length of the second PVB 106 from block 251 to M1 is equal to M1*8−251, where M1 may be a largest even number such that blocks numbered 252 through M1*8−251 in the bit map do not have a '1' bit. A length of the second PVB 106 from block 251 to MX is equal to (MX+1)*8−251, where blocks MX+1 to 753 do not include a '1' bit.

Figure 5:
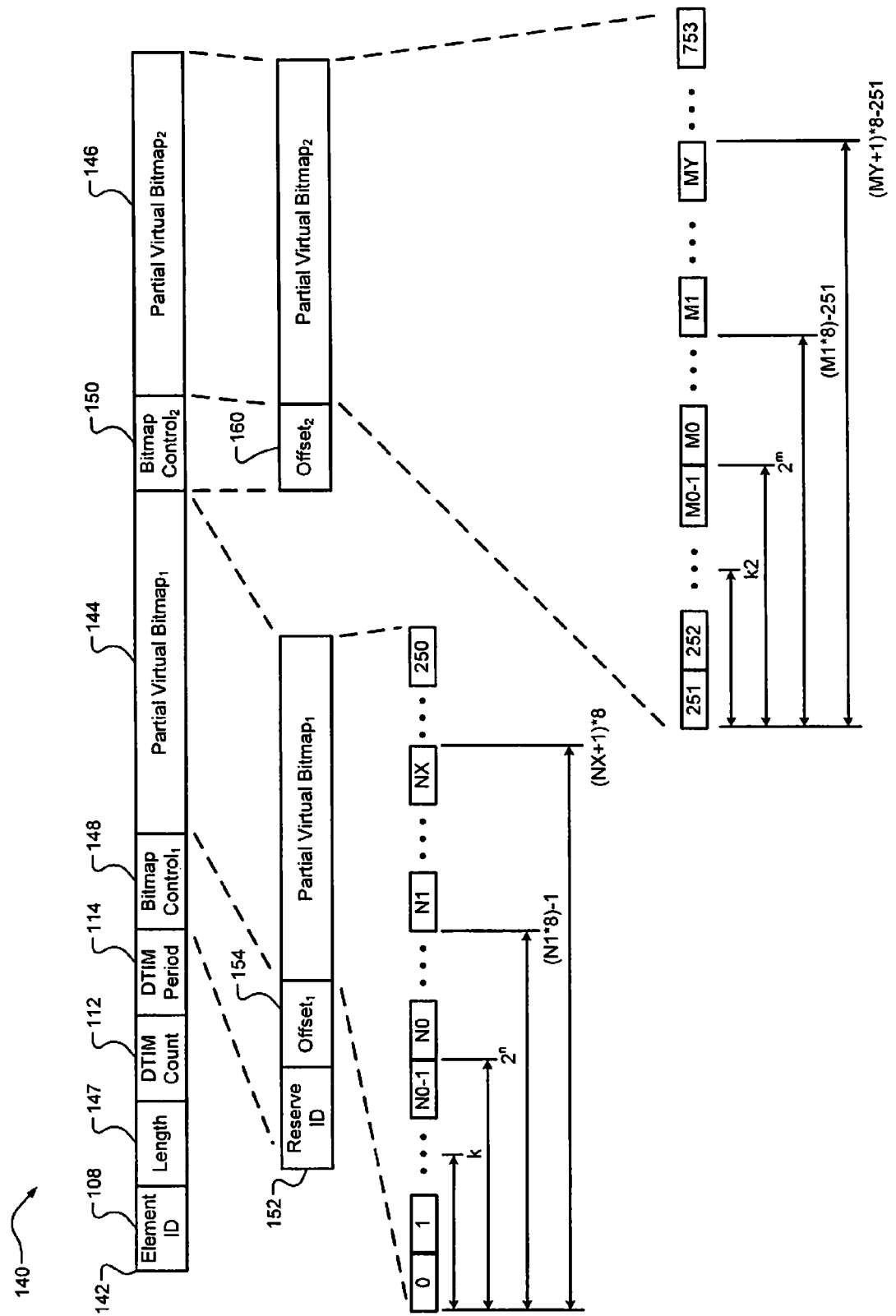
FIG. 5 is another traffic information message diagram illustrating use of multiple BSSIDs and multiple partial virtual bitmaps in accordance with the present disclosure.

In FIG. 5, another TIM diagram 140 is shown illustrating use of multiple BSSIDs and multiple PVBs. The TIM diagram 140 includes a TIM 142, which may be a DTIM. The TIM 142 includes multiple information fields, a first PVB 144, and a second PVB 146. The first PVB 144 and second PVB 146 may be fragments of a single PVB. The information fields include the element ID 108, the length 147, the DTIM count 112, the DTIM period 114, and first and second bitmap control field 148, 150.

In the example shown, the length 147 may indicate a length associated with bits of the PVBs 144, 150 and the second bitmap control field 150. The length 147 does not include an initial series of '0' bits and an ending series of '0' bits. The PVBs 144, 150 may include blocks 0-753. Blocks 0 to N1−1 may be an initial series of '0' bits if there is not multicast or broadcast data to send and blocks N0 to N1−1 do not have a '1' bit. Blocks MY+1 to 753 may be an ending series of '0' bits. In this example, the length 147 is equal to MY-N1+5. Although the TIM 142 is shown as including a single length field, additional length fields may be included to indicate lengths of additional PVBs.

The first bitmap control field 148 includes a reserve ID 152 and a first offset 154, which are similar to the reserve ID 120 and first offset 122 of FIG. 3. The reserve ID 152 may be a BSSID for all of the stations in a network or a portion (or first group) of the stations in the network. The first offset 154 may indicate a number (or AID) of block N1 in the first PVB 144. The first offset 154 may include 7 bits and be equal to a difference of N1-N0 divided by 2. As there are 7 bits in the first offset 154, the first offset 154 may represent $2^7$ or 128 bits. As a result, the resolution of the first offset 154 is 2.

The first PVB 144 may include, for example, blocks 0-250. Although the first PVB 144 is shown as having 250 blocks, the first PVB 144 may have a different number of blocks. Each block may include 1 byte (or 8 bits) or another suitable amount of bits and/or bytes. Blocks 0 to N0−1 may be reserved for multicast and/or broadcast group BSSIDs. Blocks N0 to 250 may be reserved for unicast AIDs.

The second bitmap control field 150 may include a second offset 160. The second offset 160 may indicate a number (or AID) of block M1 (e.g., block 290) in the second PVB 146. The block MY identifies a last one of the AIDs in the first PVB 44 for which the AP 12 has data to send, where Y is the number of blocks in the range of blocks M1 to MY. The second offset 160 may include 7 bits and be equal to a difference of M1−M0 divided by 2. As there are 7 bits in the second offset 160, the second offset 160 may represent $2^7$ or 128 bits. As a result, the resolution of the second offset 160 is 2.

The second PVB 146 may include, for example, blocks 251-753. Although the first PVB 144 is shown as having blocks 251-753, the second PVB 146 may have a different range and/or number of blocks. Each block may include 1 byte (or 8 bits) or another suitable amount of bits and/or bytes. Blocks 251 to M0−1 may be reserved for multicast and broadcast group BSSIDs. If a bit in one of the blocks 251 to M0−1 is set to '1', then the AP 12 has buffered data to send to the group having a BSSID assigned to that bit. If the bit is set to '0', then the AP 12 does not have buffered data to send to the group. Each station assigned to the first PVB 144 may have an AID and a corresponding AID bit in one of the blocks M0 to 753. If a bit in one of the blocks M0 to 753 is set to '1', then the AP 12 has buffered data to send to the station having an AID assigned to that bit. If the bit is set to '0', then the AP 12 does not have buffered data to send to the station. Although shown as separate PVBs, the first PVB 144 and the second PVB 146 may be segmented fragments of a single PVB.

Referring now to FIGS. 4 and 5, since the second PVB 146 of the TIM 142 of FIG. 5 includes multicast and/or broadcast group bits in blocks 251 to M0−1, stations associated with these bits do not need to review blocks 0 to N0−1 to determine whether there is multicast and/or broadcast data for the stations. Put another way, stations with AIDs associated with blocks M0-753 that are in groups associated with blocks 251 to M0−1 do not need to review blocks 0 to N0−1. This is unlike stations with AIDs associated with blocks M0-753 of the TIM 102 of FIG. 4, which review blocks 0 to N0−1 to determine whether there is multicast and/or broadcast data. As a result, the implementation of FIG. 5 reduces time for a station to determine whether the AP 12 has multicast and/or broadcast data for the station.

Figure 6:
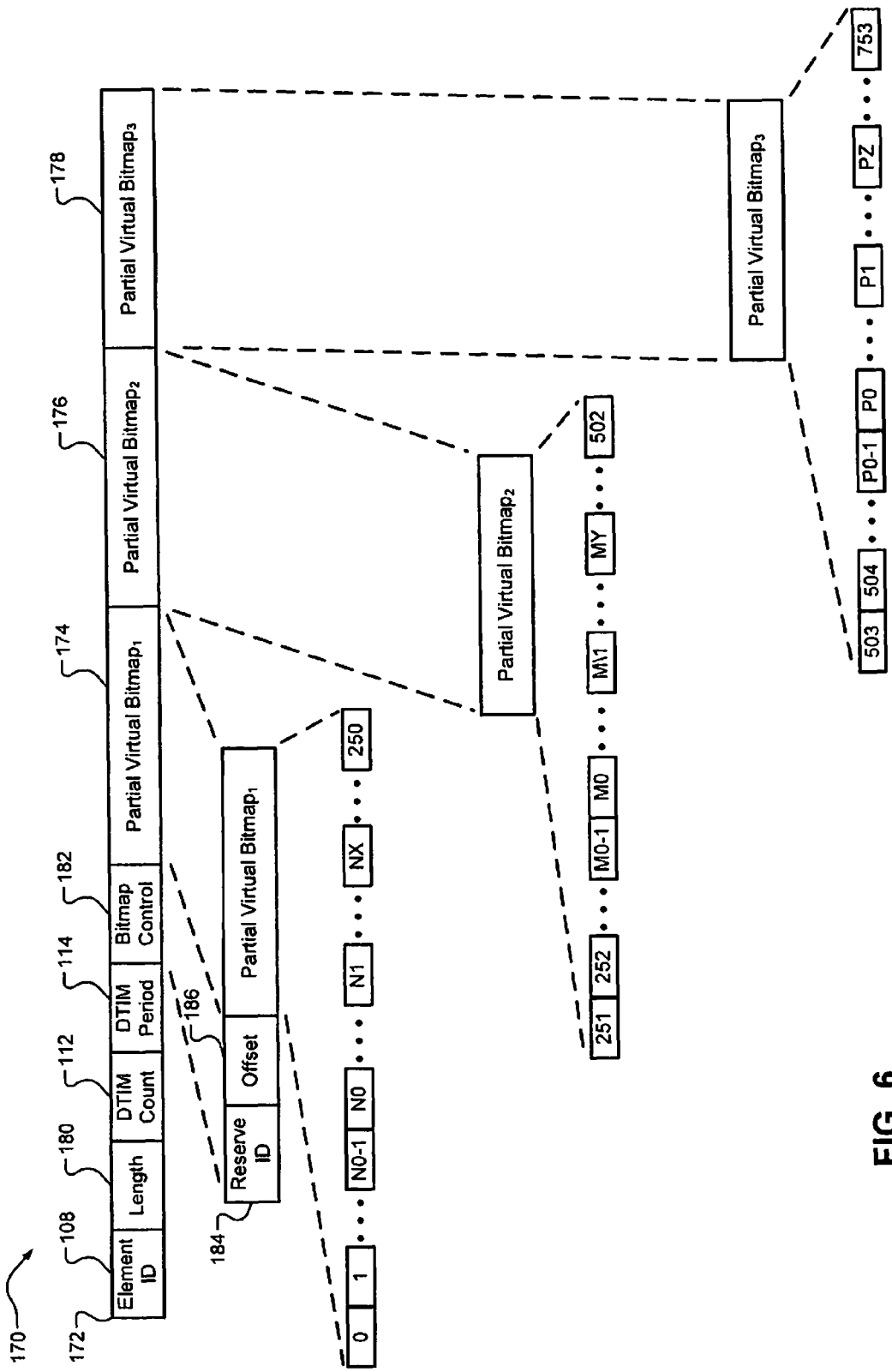
FIG. 6 is yet another traffic information message diagram illustrating use of multiple partial virtual bitmaps each having multiple BSSID bits in accordance with the present disclosure.

In FIG. 6, another TIM diagram 170 is shown illustrating use of multiple PVBs each having multiple BSSID bits. The TIM diagram 170 includes a TIM 172, which may be a DTIM. The TIM 172 includes multiple information fields and multiple PVBs. The PVBs may be fragments of a single PVB. Although the TIM 172 may include any number of PVBs, in the example shown, the TIM 172 includes three PVBs 174, 176, 178. The information fields include the element ID 108, a length 180, the DTIM count 112, the DTIM period 114, and a bitmap control field 182. The length 180 may be, for example, PZ−N1+4 when there is no multicast and/or broadcast data associated with the groups identified in blocks 0 to N0−1. The length 180 may be equal to, for example, PZ+4 when there is multicast and/or broadcast data for a group associated with block 0. The bitmap control field 182 includes a reserve ID 184 and an offset 186. The offset 186 may indicate an offset value for each of the PVBs 174, 176, 178. The PVBs 174, 176, 178 may have the same offset value. If the PVBs 174, 176, 178 have the same offset value, then N1*8−1 is equal to M1*8−251 and P1*8−503. If the number of bits in each block is different than 8, then N1*L−1 is equal to M1*L−251 and P1*L−503, where L is the number of bits in each block.

The first PVB 174 may include, for example, blocks 0-250. Although the first PVB 174 is shown as having 250 blocks, the first PVB 174 may have a different number of blocks. Each block may include 1 byte (or 8 bits) or another suitable amount of bits and/or bytes. Bits 0 to $2^n-1$ of blocks 0 to N0−1 may be reserved for multicast and/or broadcast groups and corresponding BSSIDs. Each station assigned to the first PVB 174 may have an AID and a corresponding AID bit in one of the blocks N0 to 250.

The second PVB 176 may include, for example, blocks 251 to 502. Although the second PVB 176 is shown as having blocks 251 to 502, the second PVB 176 may have a different range and/or number of blocks. Each bit in the second PVB 176 may be associated with a different group and/or station than the bits in the first PVB 174. Groups associated with the second PVB 176 may include stations in the groups of the first PVB 174 or may be exclusive of the groups of the first PVB 174. Each block in the second PVB 176 may include 1 byte (or 8 bits) or another suitable amount of bits and/or bytes. Bits 0 to $2^m-1$ of blocks 251 to M0−1 may be reserved for multicast and/or broadcast groups and corresponding BSSIDs. Each station assigned to the second PVB 176 may have an AID and a corresponding AID bit in one of the blocks M0 to 502.

The third PVB 178 may include, for example, blocks 503 to 753. Although the third PVB 178 is shown as having blocks 503 to 753, the third PVB 178 may have a different range and/or number of blocks. Each bit in the third PVB 178 may be associated with a different group and/or station than the bits in the first PVB 174 and the second PVB 176. Groups associated with the third PVB 178 may include stations in the groups of the first PVB 174, the second PVB 176, or may be exclusive of the groups of the first PVB 174 and the second PVB 176. Each block in the third PVB 178 may include 1 byte (or 8 bits) or another suitable amount of bits and/or bytes. Bits 0 to $2^p-1$ of blocks 503 to P0−1 may be reserved for multicast and/or broadcast groups and corresponding BSSIDs. Each station assigned to the third PVB 178 may have an AID and a corresponding AID bit in one of the blocks P0 to 753. Although shown as separate PVBs, the PVBs 174, 176, 178 may be segmented fragments of a single PVB.

Stations may check one or more of the PVBs 174, 176, 178 when determining if the stations belong to a group for which the AP 12 has multicast and/or broadcast data. In one implementation, each group in each of the PVBs 174, 176, 178 is exclusive of groups in the ones of the PVBs 174, 176, 178. In this implementation, each station checks the single PVB assigned to that station and not the other PVBs to check a status of pending multicast and/or broadcast data at the AP 12 for that station.

As an alternative to the implementation of FIG. 6, blocks 251 to M0−1 and 503 to P0−1 of the second and third PVBs 176, 178 may be used for unicast AIDs rather than BSSIDs. In this implementation, blocks 0 to N0−1 may be used for each of the groups. Stations having unicast AIDs in the second and third PVBs 176, 178 check blocks 0 to N0−1 for multicast and/or broadcast data statuses.

Figure 7:
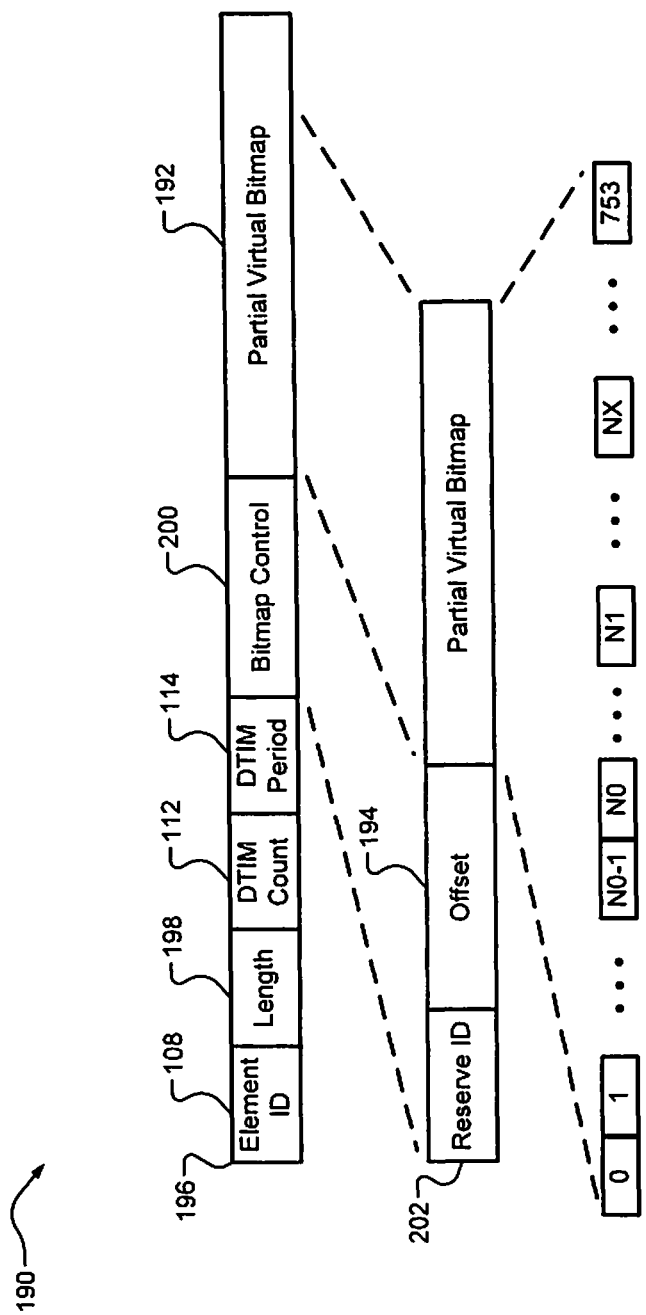
FIG. 7 is another traffic information message diagram illustrating use of a single partial virtual bitmap and a two-byte offset in accordance with the present disclosure.

In FIG. 7, is another TIM diagram 190 is shown illustrating use of a single PVB 192 and a two-byte offset 194. The TIM diagram 190 includes a TIM 196, which may be a DTIM. The TIM 196 includes multiple information fields and the PVB 192. The information fields include the element ID 108, a length 198, the DTIM count 112, the DTIM period 114, and a bitmap control field 200. The bitmap control field 200 includes a reserve ID 202 and the offset 194. The offset 202 may be 2 bytes in length. The offset 202 may be equal to N1. As a result, the resolution may be equal to 1 and the offset 202 may represent $2^{16}$ or 65,536 bits.

The PVB 192 may include, for example, blocks 0-753. Although the PVB 192 is shown as having 753 blocks, the PVB 192 may have a different number of blocks. Each block may include 1 byte (or 8 bits) or another suitable amount of bits and/or bytes. Bits 0 to $2^n-1$ of blocks 0 to N0−1 are reserved for multicast and/or broadcast groups and corresponding BSSIDs. Each station assigned to the PVB 192 may have an AID and a corresponding AID bit in one of the blocks N0 to 753. This provides single PVB that is extended over a PVB having, for example, 250 bits.

Figure 8:
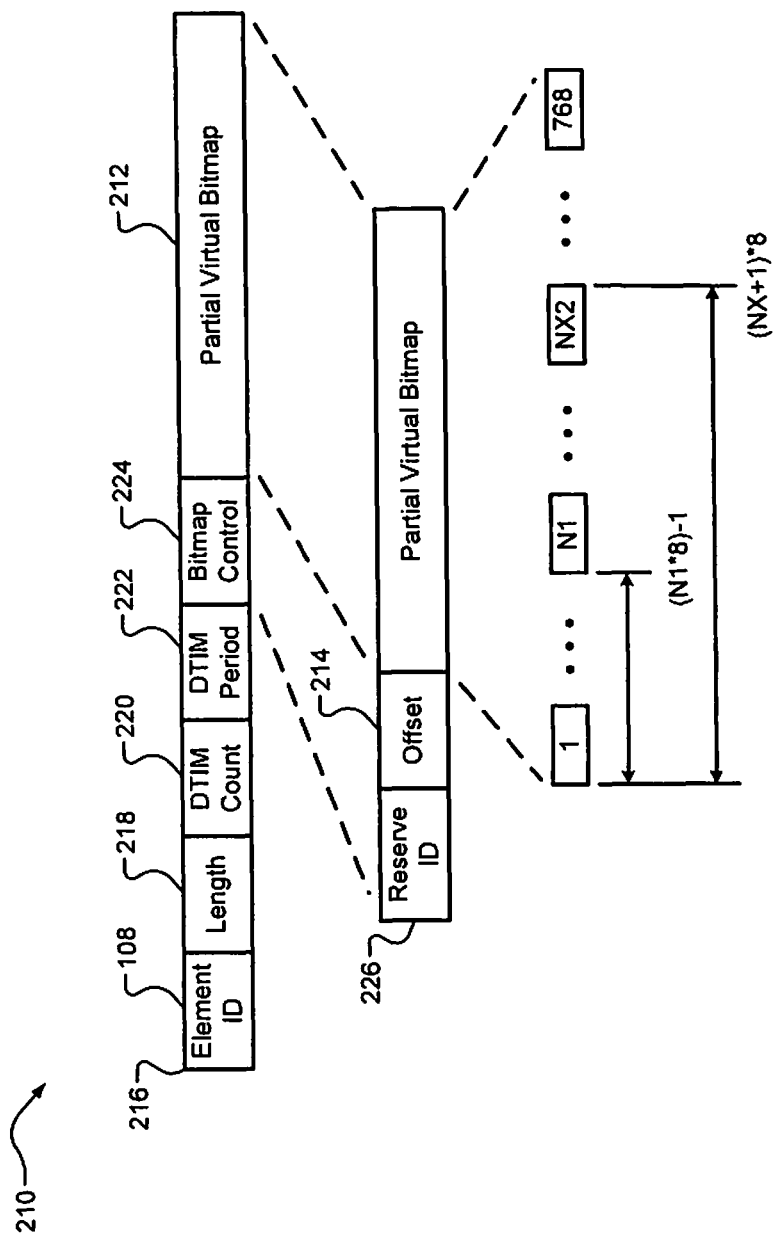
FIG. 8 is still another traffic information message diagram illustrating use of a single partial virtual bitmap and a single-byte offset in accordance with the present disclosure.

In FIG. 8, another TIM diagram 210 is shown illustrating use of a single PVB 212 and a single-byte offset 214. The TIM diagram 210 includes a TIM 216, which may be a DTIM. The TIM 216 includes multiple information fields and the PVB 212. The information fields include the element ID 108, a length 218, the DTIM count 220, the DTIM period 222, and a bitmap control field 224. The bitmap control field 224 includes a reserve ID 226 and the offset 214. The offset 214 may be 1 byte in length. The offset 214 may be equal to N1/6. As a result, the resolution may be equal to 6 and the offset 214 may represent $2^7$ or 128 bits. The resolution may be adjusted based on the number of an end block with a '1' bit (e.g., N1) and/or based on a number of stations to receive data from the AP 12.

The PVB 212 may include, for example, blocks 1-768. Although the PVB 212 is shown as having 768 blocks, the PVB 212 may have a different number of blocks. Each block may include 1 byte (or 8 bits) or another suitable amount of bits and/or bytes. Each station assigned to the PVB 212 may have an AID and a corresponding AID bit in one of the blocks 1 to 768.

Figure 9:
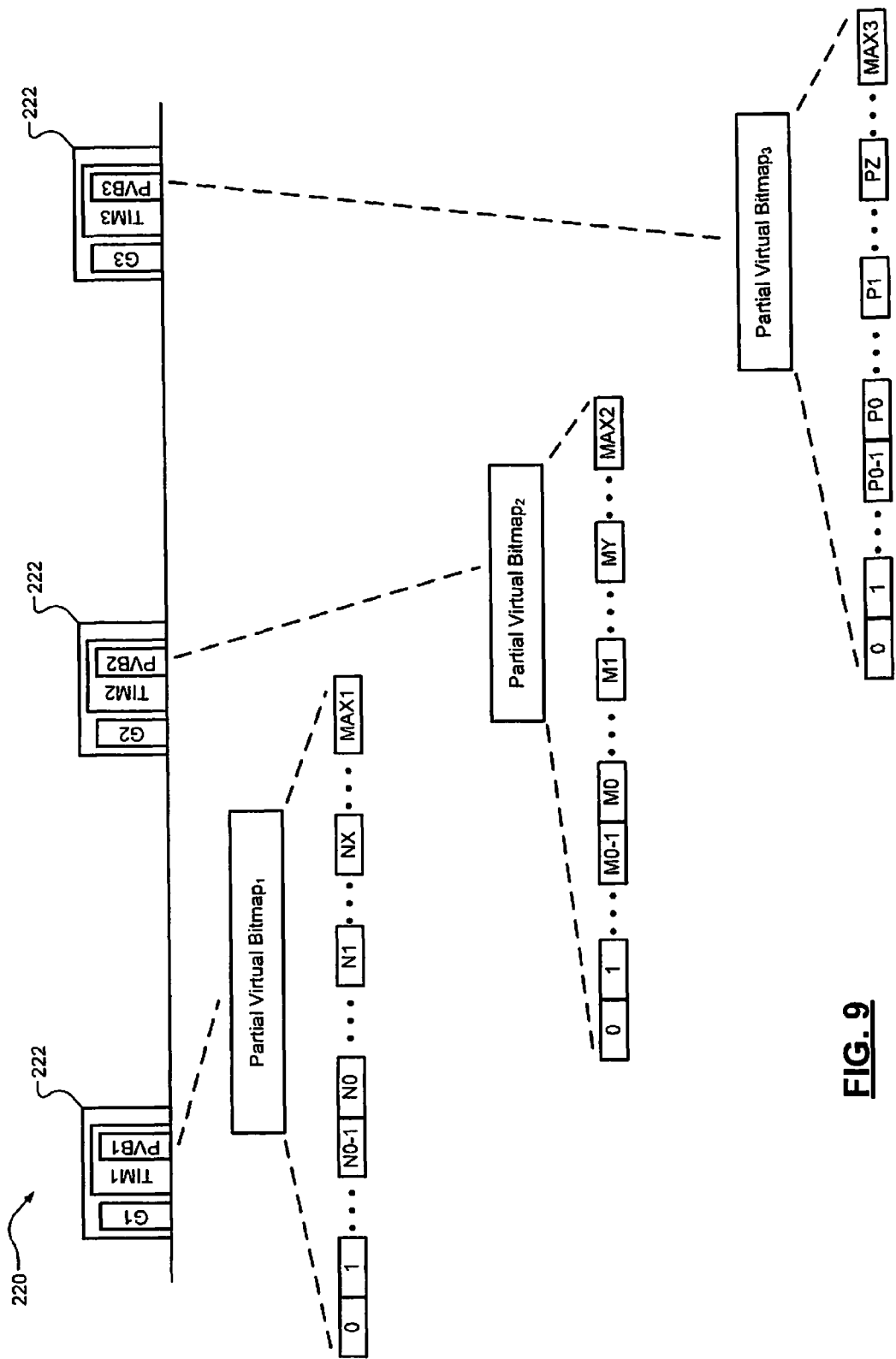
FIG. 9 is a beacon and partial virtual bitmap diagram illustrating partial virtual bitmap segmentation in accordance with the present disclosure.

In FIG. 9, a beacon and PVB diagram 220 is shown illustrating PVB segmentation. The AP 12 of FIG. 1 may periodically transmit beacons 222. Each of the beacons 222 may include group information signals (e.g., G1-G3) and a TIM or DTIM (e.g., TIM1-TIM3). Each of the TIMs may include a PVB (e.g., PVB1-PVB3). The group information signals may include, for example, a number of groups, a number of sets, and a number of subsets in each PVB and/or TIM. Each group may include a predetermined or selected number of sets. Each set may include a predetermined or selected number of subsets. Each subset may include a predetermined or selected number of stations (STAs). The number of sets (e.g., 8) in each group and AID associated with the sets of each group may be included in the group information. The number of subsets (e.g., 8) in each set and AID associated with the subsets of each set may be included in the group information. The number of stations (e.g., 8) in each subset and AID associated with the stations of each subset may be included in the group information. The number of groups, sets in each group, subsets in each set, and stations in each subset may be determined by the AP 12 based on, for example, the number of networks associated with the AP 12, the number of stations associated with each network, and an amount of downlink and uplink traffic on a channel.

Figure 10:
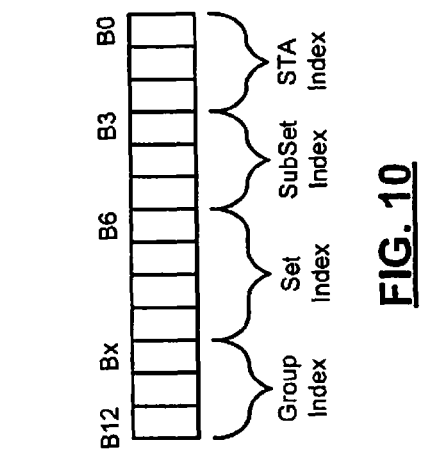
FIG. 10 is an AID grouping diagram in accordance with the present disclosure.
Figure 11:
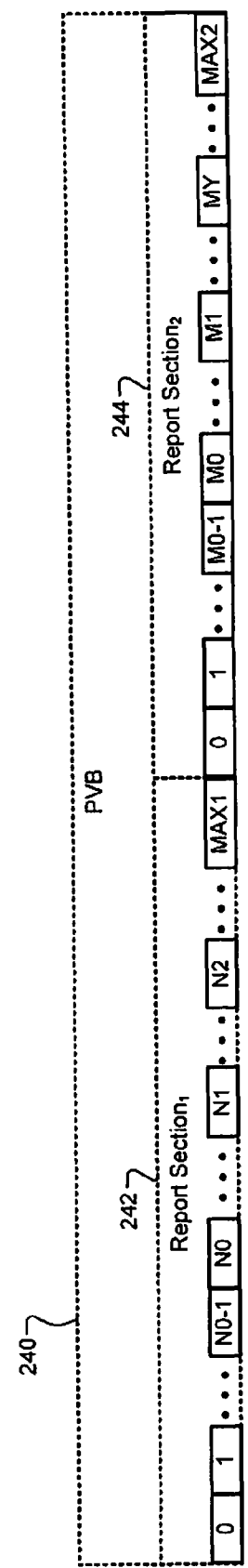
FIG. 11 is a partial virtual bitmap in accordance with the present disclosure.

Referring now to FIG. 10, an AID grouping diagram 230 is shown. An AID space of, for example, 6000 or more unicast AIDs may be divided into groups (or jumbo groups), sets (or subgroups), and subsets. The groups may each have respective BSSIDs, group AIDs, set AIDs, and/or subset AIDs. The BSSIDs, group AIDs, set AIDs, and/or subset AIDs map to stations in each of the groups, sets, and subsets. An AID range and size of each group, set and subset may be predefined, selected by an AP, and/or announced in group information signals, TIM fields, and/or DTIM fields. An AID range and a size may refer to a length starting at a first group AID block, set AID block, and/or subset AID block that has a '1' bit and ends with a last group AID block, set AID block, and/or subset AID block with a '1' bit. The AID range may refer to contiguous '1'-bit blocks. A '1'-bit block has at least one bit that is a '1'. Contiguous '1'-bit blocks refer to a series of sequential blocks that each has a '1' bit. The size may refer to contiguous and/or non-contiguous '1'-bit blocks. Non-contiguous '1' bit blocks refer to a series of sequential blocks, where not each of the blocks has a '1' bit. The size may include one or more AID ranges. The size may include, for example, non-contiguous groups, sets and/or subsets, where one or more PVB blocks without a '1' bit are between two group AID blocks, set AID blocks, or subset AID blocks that do have a '1' bit.

The AID grouping diagram 230 includes a group index, a set index, a subset index, and a station index. The group index may include a predetermined or selected number of groups. Each of the groups may identify set AIDs associated with that group. The set index may include a predetermined or selected number of sets. Each of the sets may identify subset AIDS associated with that set. The subset index may include a predetermined or selected number of subsets (e.g., 8 subsets). Each of the subsets may identify station AIDs (e.g., 8 station AIDs) associated with that subset.

In the example provided, the station index is shown as having bits B0 to B2, which can represent at most 8 stations. The subset index is shown as having bits B3 to B5, which can represent 8 subsets. The set index is shown as having bits B6 to Bx. The group index is shown as having bits Bx to B12. As an example, the bit Bx may be adjusted to change the number of bits associated with the group index and the set index, where x may range between 6 and 11 with a default value of 10. The value x may be fixed or dynamically adjusted based on a number of networks, stations, and amount of downlink and uplink traffic on a channel.

Referring again to FIG. 9, the group information signals G1-G3 may also include offset and range information for each of the PVB1-PVB3. The offset information may identify the first unicast block in a PVB that includes a '1' bit. The range information may include a length of unicast blocks from a first block in the PVB with a '1' bit to a last block in the PVB with a '1' bit.

Each of the TIM1-TIM3 may be configured similar to any of the TIMs disclosed herein and/or include one or more of the PVBs disclosed herein. In the example shown, each of the TIM1-TIM3 includes a respective one of the PVB1-PVB3. The PVB1-PVB3 may be fragments of a single PVB.

PVB1 may include blocks 0 to MAX1. Each of the blocks 0 to MAX1 may include 1 byte (or 8 bits) or another suitable amount of bits and/or bytes. Bits 0 to $2^n-1$ of blocks 0 to N0−1 may be reserved for multicast and/or broadcast groups and corresponding BSSIDs. Each station assigned to PVB1 may have an AID and a corresponding AID bit in one of the blocks N0 to MAX1.

The PVB2 may include, for example, blocks 0 to MAX2. Although PVB2 is shown as having blocks 0 to MAX2, the PVB2 may have a different range and/or number of blocks. Each bit in the PVB2 may be associated with a different group and/or station than the bits in PVB1. Groups associated with the PVB2 may include stations in the groups of PVB1 or may be exclusive of the groups of PVB1. Each of the blocks 0 to MAX2 in PVB2 may include 1 byte (or 8 bits) or another suitable amount of bits and/or bytes. Bits 0 to $2^m-1$ of blocks 0 to M0−1 are reserved for multicast and/or broadcast groups and corresponding BSSIDs. Each station assigned to PVB2 may have an AID and a corresponding AID bit in one of the blocks M0 to MAX2.

PVB3 may include, for example, blocks 0 to MAX3. Although PVB3 is shown as having blocks 0 to 753, PVB3 may have a different range and/or number of blocks. Each bit in PVB3 may be associated with a different group and/or station than the bits in PVB1 and PVB2. Groups associated with PVB3 may include stations in the groups of PVB1, PVB2, or may be exclusive of the groups of PVB1 and PVB2. Each of the blocks 0 to 753 in PVB3 may include 1 byte (or 8 bits) or another suitable amount of bits and/or bytes. Bits 0 to $2^p-1$ of blocks 0 to P0−1 are reserved for multicast and/or broadcast groups and corresponding BSSIDs. Each station assigned to PVB3 may have an AID and a corresponding AID bit in one of the blocks P0 to MAX3. Although shown as separate PVBs, the PVB1-PVB3 may be segmented fragments of a single PVB.

Although each of the beacons 222 are shown as having a single TIM and a single PVB, each of the beacons 222 may have more than one TIM and each TIM may have one or more PVBs. Each PVB may have one or more report sections. An example of a PVB with more than one report section is shown in FIG. 11.

Referring now also to FIG. 11, a PVB 240 is shown. The PVB 240 may be used in one of the TIMs disclosed herein. The PVB 240 may include any number of report sections (two report sections 242, 244 are shown). The report sections may be fragments of a single PVB. Each of the report sections may include, for example, group AID bits (or BSSID bits) and/or blocks, offset bits and/or blocks, range bits and/or blocks, and unicast AID bits and/or blocks. Blocks 0 to N0−1 and 0 to M0−1 may be reserved for the group AID bits, the offset bits and/or the range bits. As an alternative to including the offset bits and the range bits in the PVBs, the offset bits and range bits may be provided in group information signals (e.g., the group information signals G1-G3 of FIG. 9) and/or as fields in a TIM.

Each offset byte of the offset information may identify the first unicast block in a PVB and/or a report section that includes a '1' bit. The range information may include a length of unicast blocks starting at a first block in the PVB and/or report section with a '1' bit and ending with a last block in the PVB and/or report section with a '1' bit.

Figure 12:
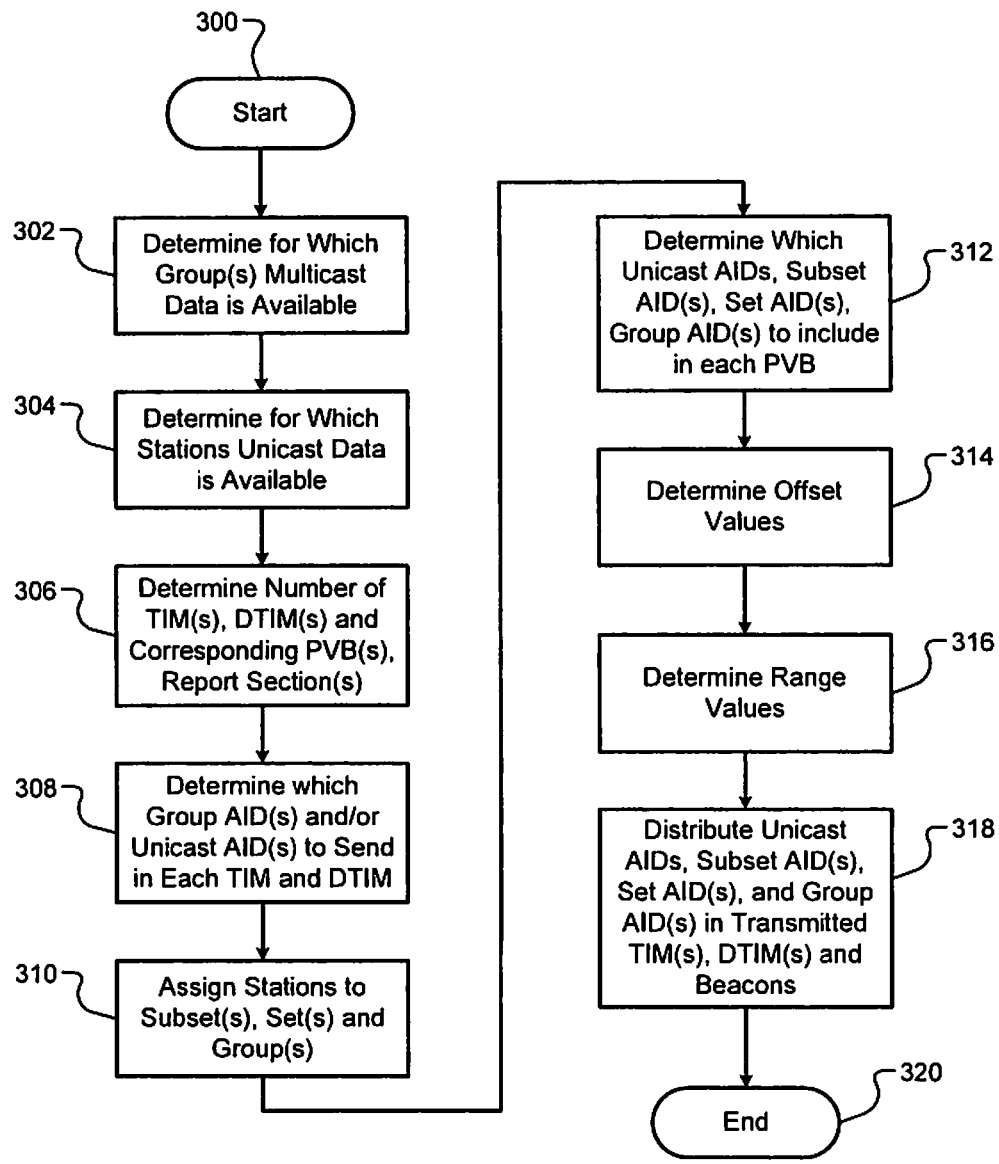
FIG. 12 is a method of segmenting TIMs and generating beacons in accordance with the present disclosure.

In FIG. 12, a method of segmenting TIMs and generating beacons is shown. Although the following tasks are primarily described with respect to the implementations of FIGS. 1-11, the tasks may be easily modified to apply to other implementations of the present disclosure. The tasks may be iteratively performed. The method may begin at 300. Information determined in the following tasks 302-316 is referred to as segmentation information.

At 302, the multicast module 56 may determine for which groups multicast and/or broadcast frames of data are available (i.e. stored in the AP 12 for the groups). At 304, the unicast module 58 may determine for which stations unicast data is available (i.e. stored in the AP 12 for stations).

At 306, the segmentation module 60 determines the number of TIM(s) and/or DTIM(s) to transmit partial virtual bitmap(s) and/or number of PVB(s) and report sections in each of the TIM(s) and DTIM(s). These determinations may be performed based on: which groups and/or the number of groups for which the AP 12 has data; the number of stations for which the AP 12 has data; the amount of data to be transmitted from the AP 12 to the stations; and/or the amount of traffic (i.e. uplink and downlink traffic) currently and/or to be experienced by the AP 12.

At 308, the segmentation module 60 may determine which group AID(s) and/or unicast AID(s) to send in each TIM and/or DTIM. A TIM (or DTIM) may include unicast AIDs only for stations associated with the group AIDs in that TIM (or DTIM) or may include other unicast AIDs. One or more groups may be associated with each TIM and/or DTIM.

At 309, the segmentation module 60 performs, if not already performed, a grouping procedure to assign the stations for which the AP 12 has data to subsets, sets, and/or groups. Division of groups, sets and subsets may be static (fixed with unadjusted values) and/or dynamic (adjusted over time). The AP 12 may divide a group of stations into sets and/or subsets of stations based on a size of a PVB, a number of stations for which the AP 12 has downlink (multicast, broadcast, and/or unicast) data and/or a number of stations allowed for uplink transmission. The grouping procedure includes determining which station AIDs to include in each subset of stations, set of stations and/or group of stations. At 310, the segmentation module 60 assigns subset AIDs, set AIDs, and group AIDs to each station based on results of the grouping procedure. Each station may have zero, one, or more than one group AID. A group AID can be assigned to two or more stations and may refer to the above-described BSSIDs. Each group AID bit indicates at least one buffered frame for at least one station assigned to the group AID. Group AIDs may be assigned by the AP 12 according to addresses of stations in the group and indicated in a beacon.

At 312, the segmentation module 60 may determine which unicast AIDs, subset AIDs, set AIDs, and/or group AIDs to include in each PVB and/or report section of each PVB of each of the TIM(s) and DTIM(s). The segmentation module 60 may allocate certain AID blocks to groups, sets and/or subsets of stations receiving and/or providing similar or unique services. In one implementation, AID blocks having smaller AID values are used for higher priority services and AID blocks with larger AID values are used for lower priority services. In another implementation, AID blocks having larger AID values are used for higher priority services and AID blocks with smaller AID values are used for lower priority services. AID blocks associated with lower priority services may have longer sleeping interval requirements over AID blocks associated with higher priority services.

AIDs can be assigned, reassigned, to different stations based on: network dynamics, such as: an amount of traffic; stations involved in the traffic; a number of stations receiving each service; a number of groups, sets, and/or subsets; etc. A station may be permitted to change from one group, set, and/or subset to another group, set and/or subset. The change in groups, sets and/or subsets may be initiated and performed by the AP 12 or may be requested by the station. This change may include changing group AIDs, set AIDs, subset AIDs, and/or unicast AIDs. The change may also be performed without the station needing to become reassociated with the AP 12 and/or reauthorized by the AP 12.

The stations of each group, set and/or subset may be changed and the number of groups, sets and/or subsets may be changed. The groups, sets and subsets may be reassociated with different BSSIDs (or AIDs). A master key may be used to generate pairwise transient keys (PTKs) for the groups. Each group may have a BSSID (or a group AID) and associated PTK. When a group is switched from a first BSSID to a second BSSID, a station may reuse a previous PTK or switch to an updated PTK. Each PTK may be used to encrypt data transmitted between the AP 12 and the stations of the group, sets and/or subsets associated with the PTK.

At 314, the offset module 62 may determine offset values for each of the PVBs and/or report sections. At 316, the range module 64 may determine range values corresponding to each one of the range values for each of the PVBs and/or report sections.

At 318, the bitmap control module 52 may distribute unicast AIDs, subset AIDs, set AIDs, and group AIDs in transmitted report sections, TIMs, DTIMs, and beacons according to the segmentation information determined at 302-316. PVBs may be segmented into TIMs, DTIMs and/or report sections based on AID subspaces associated with groups, sets and/or subsets. Each portion of a PVB that results from segmenting may be referred to as a fragment of the PVB. Report sections, PVBs, TIMs and DTIMs may be generated according to the segmentation information prior to transmitting the associated beacons.

Each group, set, and/or subset may have a designated DTIM. Each group, set and/or subset may have a solely assigned DTIM or may share a DTIM with one or more other groups, sets and/or subsets. Each DTIM includes the group AID(s), set AID(s) and/or subset AID(s) associated with that DTIM. These AIDs may be referred to as group addressed BU indicators, which indicate whether the AP 12 has multicast and/or broadcast data for that the associated group(s), set(s), and/or subset(s). Each DTIM includes time indications of when a next and/or subsequent DTIM(s) associated with each group, set and/or subset is to be transmitted. This indicates to stations when associated multicast and/or group data is to be transmitted. Each DTIM may also include TIM AID bitmap fragment(s) including unicast AIDs corresponding to one or more or all subset(s) and set(s) of an associated group.

Each beacon may include time indications of when a next DTIM and/or subsequent DTIMs associated with one or more groups are to be transmitted. Each beacon may include a TIM, a DTIM, and/or a combination of a DTIM and one or more TIM(s). A broadcast frame transmitted to all stations associated with the AP 12 may be transmitted multiple times for a group, where the AP 12 has assigned multiple BSSIDs. For example, if the group is split into sets and each set has an associated DTIM, the same broadcast data may be transmitted subsequent to each of the DTIMs of the sets.

The above-described tasks of FIG. 12 are meant to be illustrative examples; the tasks may be performed sequentially, synchronously, simultaneously, continuously, during overlapping time periods or in a different order depending upon the application. Also, any of the tasks may not be performed or skipped depending on the implementation and/or sequence of events.

Referring again to FIG. 1, the AP 12 may stagger downlink and/or uplink times of stations to reduce channel congestion and/or access delays. The channel may include one or more frequencies. As many as all of the stations may communicate with the AP 12 using the one or more frequencies. The AP 12 may stagger medium accesses in time, frequency and/or space domains. This may include downlink and uplink transmissions at different times, at different frequencies, and/or with different antennas and/or numbers of antennas. The AP 12 may stagger wake up times of stations to prevent stations from sending poll signals during the same time period (e.g., the same period subsequent to the same beacon).

The stations (e.g., the stations 14) disclosed herein may operate in a wireless network management (WNM) sleep mode. In this mode, the stations may: wake up for each DTIM interval to receive group addressed frames; during certain sleep intervals negotiated with the AP 12; and/or send at least one frame to the AP 12 each BSS maximum idle period. A BSS maximum idle period may refer to a period when a station is not receiving downlink data and/or transmitting uplink data. A frame may be transmitted to the AP 12 each BSS maximum idle period to maintain a link between the AP 12 and the station.

The stations (e.g., the stations 14) disclosed herein may operate in a flexible multicast service (FMS) mode. In this mode, the stations may: wake up each DTIM interval to receive group addressed frames; and/or wake up at least each FMS delivery interval for group addressed frames. A FMS interval may be equal to any multiple of DTIM intervals.

Downlink Transmissions

Referring again to FIG. 2, the AP downlink module 46 may stagger downlink transmissions using multiple techniques. In a first technique, the AP downlink module 46 may advertise a TIM PVB in multiple beacons, TIMs and/or DTIMs. A TIM may be referred to as a TIM announcement and a DTIM may be referred to as a DIM announcement. Since the TIM PVB is provided in multiple beacons, TIMs and/or DTIMs and since stations poll or trigger the AP for BUs when determining that corresponding unicast AID bits are set to '1' in the TIM PVB, the downlink times are staggered over time.

A station may start a next sleep cycle subsequent to receiving a portion (unicast AID bit) of the TIM PVB that indicates whether the AP 12 has unicast data to send to the station. By doing this, a mode schedule of the station follows a TIM PVB announcement schedule. The mode schedule includes standby mode and active mode periods for the station. The TIM PVB announcement schedule includes times the TIM PVB and/or portions of the TIM PVB are transmitted. The AP downlink module 46 may adjust the TIM PVB announcement schedule to stagger station wake-up times.

Figures 13, 14:
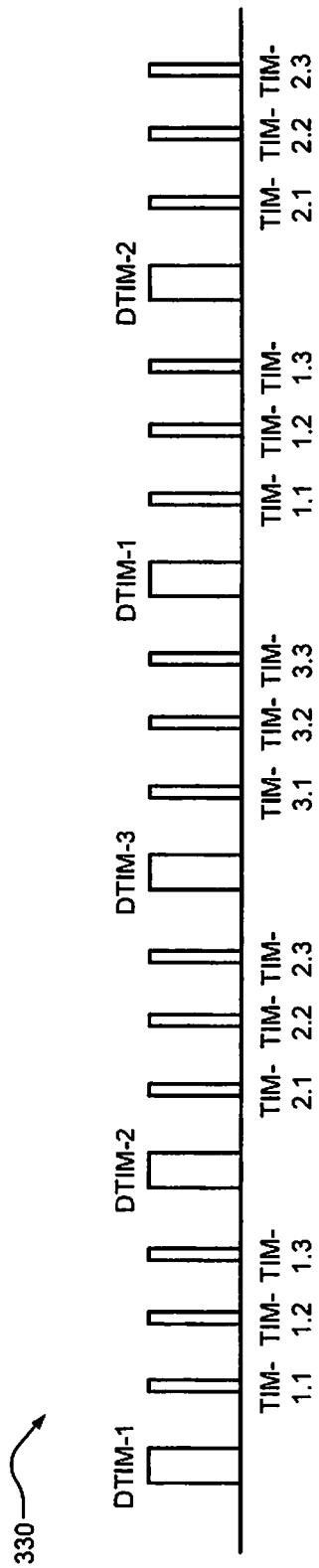
FIG. 13 is a beacon transmission diagram for a beacon schedule with uniform DTIM intervals and a uniform number of TIM transmissions per DTIM in accordance with the present disclosure.
FIG. 14 is a beacon transmission diagram for a beacon schedule with non-uniform DTIM intervals and a non-uniform number of TIM transmissions per DTIM in accordance with the present disclosure.

In FIG. 13, a beacon transmission diagram 330 is shown for a beacon schedule with uniform DTIM intervals and a uniform number of TIM transmissions per DTIM. The beacon transmission diagram 330 includes DTIMs and TIMs. Multiple TIMs are transmitted between sequential DTIMs. In the example shown, DTIM-1, DTIM-2, DTIM-3 are shown. The DTIM-1 has associated TIM-1.1 to TIM-1.3. The DTIM-2 has associated TIM-2.1 to TIM-2.3. The DTIM-3 has associated TIM-3.1 to TIM-3.3. TIMs are transmitted between sequential DTIMs. Although the beacon transmission diagram 330 does not show a beacon, a beacon may be transmitted when each DTIM (DTIM beacon) and TIM (TIM beacon) is transmitted and include the corresponding DTIM or TIM. Each of the DTIMs/TIMs may be associated with a particular group. For example, TIM-1.1 to TIM-1.3 may have unicast AIDs for stations associated with the group assigned to DTIM-1.

Each of the TIMs may include group AIDs, set AIDs, and subset AIDs for a whole group. The number of TIMs transmitted between sequential DTIMs may be adjusted to allow for transmission of group AIDS, set AIDs, and subset AIDs for a whole group.

Each of the DTIMs may include indications of subsequent TIMs and/or DTIMs, such as: times of the TIMs and DTIMs; periods of the TIMs and DTIMs; and/or AID group, set, and/or subset assignments. Each TIM may include self-indication information and/or indications of subsequent TIMs and/or DTIMs. The self-indication information may include, for example, one or more offset values and one or more range values for PVBs of the TIM. The indications of subsequent TIMs and/or DTIMs may include times of the TIMs and DTIMs; periods of the TIMs and DTIMs; and/or AID group, set, and/or subset assignments.

If a DTIM/TIM includes only a portion of a PVB associated with a group, the TIM may indicate whether other portions of the PVB are to be included in subsequent TIMs. This indication may be provided prior to a next DTIM. If the TIM does not indicate whether other portions of the PVB are to be included in subsequent TIMs, the other portions may all be included in a next DTIM.

The segmenting of a PVB into DTIMs and/or TIMs causes downlink transmissions to be staggered over time, instead of being transmitted during the same period of time. The transmissions are performed subsequent to corresponding DTIMs and TIMs and prior to next sequentially transmitted DTIMs or TIMs.

In the example of FIG. 13, downlink transmissions are cycled among the groups. For each group, the stations of that group may wake up prior to a corresponding DTIM to determine whether the AP 12 has data for that group. If unicast AIDs are not included in a DTIM, each station wakes up prior to one or more subsequent TIMs to receive downlink information in the TIMs associated with the station. The downlink information indicates whether the station is to receive downlink data. The TIMs can be periodically transmitted and repeated between sequential DTIMs. The TIMs for a first group are transmitted prior to transmission of a DTIMs and TIMs of a second group. This pattern is repeated for subsequent groups until a last group's DTIM and TIMs are transmitted. At this point, the last groups TIMs are transmitted followed by a DTIM for the first group, at which point the cycle repeats.

Uplink Transmissions

Uplink transmissions may be categorized in, for example, one of three types of uplink transmissions. The first type may be high priority transmissions for high priority data. The second type may be medium priority transmissions, such as poll or trigger transmissions. The third type may be low priority transmissions for other data, which is not considered a high or medium priority.

Depending upon a number of stations and a condition of a medium, the AP 12 may control uplink transmissions and alleviate uplink medium contention. This may include, for example, the AP 12 granting uplink medium access to certain stations and not to other stations during a certain time period. Granting of access to the uplink medium may be indicated to the stations. The grant of the access medium may be indicated using beacons, DTIMs, and/or TIMs.

The AP 12 may use DTIMs and TIMs for both downlink and uplink medium access control. A DTIM or TIM may include downlink BU indications (or AIDs with a '1' bit indicating the AP has data to downlink) for a partial AID block in order to control downlink transmissions to stations within the AID block. The AP 12 may allow the stations within the AID block to send an uplink frame subsequent to the DTIM or TIM for a predetermined or selected period or until a next DTIM or TIM.

Each DTIM or TIM may include an offset value and a range value, which allows stations with AIDs larger than the offset value but within a certain AID range to send uplink frames subsequent to the DTIM or TIM. If the AP 12 sends a series of DTIMs and/or TIMs to control downlink and/or uplink medium access, the offset values associated with the DTIMs and TIMs may increase until the offset values reach a largest assigned AID. The offset values may depend on a number of stations, a condition of the medium, downlink BU indications, etc.

Figure 15:
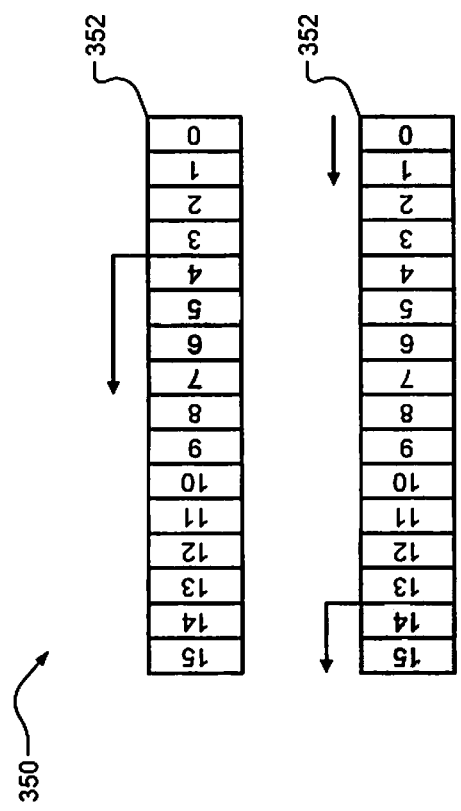
FIG. 15 is a block access control diagram in accordance with the present disclosure.

In FIG. 15, a block access control diagram 350 is shown. The block access control diagram 350 includes 16 blocks numbered 0-15. The 16 blocks are shown twice, each of which is for a different uplink access example.

The AP 12 of FIG. 1 may grant uplink channel access to one or more blocks 352 (16 blocks are shown having numbers 0-15) of stations subsequent to a DTIM or TIM. The granted access includes providing the stations in the blocks 352 with block offset and range values. In the first example, the offset is equal to 4 and the range is equal to 4. As a result, stations with AID bits in blocks 4-7 scan the associated DTIM or TIM to determine whether the AP 12 has data for these stations. In the second example, the offset value is 14 and the range is 4. As a result, stations with AID bits in blocks 14, 15, 0 1, scan the associated DTIM and TIM to determine whether the AP 12 has data for these stations. Stations associated with the offset value and range value provided may be permitted to access a channel for uplink data transmission and/or for downlink data polling. Also, the information provided in the DTIM and TIM may be limited to stations associated with the offset value and range value. Information associated with stations not included in the blocks identified by the offset value and the range value may not be included in the DTIM or TIM.

If the AP 12 enforces uplink medium access control subsequent to DTIM and TIM transmissions, then stations are granted uplink times subsequent to a DTIM and/or TIM for a certain period or prior to a next DTIM and/or TIM. Stations that are transmitting frames of high priority may transmit the frames at any time to the AP 12 without subject to the uplink access control. If transmission of a frame of high priority fails, transmission of the frame may be downgraded from the high priority ranking to a low priority ranking. This allows the AP 12 to control uplink accesses by preventing multiple stations from continuing to send frames of high priority at the same time and/or during the same period. A station may transmit poll (or trigger) frames and low priority uplink frames when an uplink medium access is granted by the DTIM and TIM. In another implementation, if the AP 12 does not enforce the uplink medium access control, the station may access the medium at any time for uplink transmission.

In FIG. 14, a beacon transmission diagram 340 is shown for a beacon schedule with non-uniform DTIM intervals and a non-uniform number of TIM transmissions per DTIM. The beacon transmission diagram 340 includes DTIMs and TIMs. Multiple TIMs are transmitted between sequential DTIMs. In the example shown, DTIM-1 and DTIM-2 are shown. The DTIM-1 has associated TIM-1.1 to TIM-1.3. The DTIM-2 has associated TIM-2.1 to TIM-2.3. TIMs are transmitted between sequential DTIMs. Although the beacon transmission diagram 340 does not show a beacon, a beacon may be transmitted when each DTIM and TIM is transmitted and include the corresponding DTIM or TIM. Each of the DTIMs may be associated with a particular group and each TIM may be associated with stations in that group. For example, TIM-1.0 to TIM-1.3 may have unicast AIDs for stations associated with the group assigned to DTIM-1.

In this example, DTIMs are transmitted less frequently then TIMs and are not transmitted in a uniform pattern. The number of TIMs and the element ID of the TIM(s) between sequential pairs of DTIMs is different. Also, the order in which the TIMs are transmitted changes. In addition, transmission of certain TIMs is repeated while transmission of other TIMs is not repeated. Although DTIM and TIM transmission for the example of FIG. 14 is different than the example of FIG. 13, the stations wake up prior to corresponding DTIMs and TIMs. Frequently transmitted TIMs allow stations to quickly obtain a grant from the AP 12 to perform an uplink transmission when the AP 12 enforces uplink medium access control. The uplink medium access control may limit uplink medium access for a station to periods subsequent to first DTIMs and TIMs associated with the station and prior to second DTIMs and TIMs sequentially after the first DTIMs and TIMs. For example, the AP 12 may provide a grant for medium access control during a current DTIM or TIM for a period subsequent to the DTIM or TIM and prior to a next DTIM or TIM.

One or more DTIMs and one or more TIMs may be assigned solely to each group. The DTIMs and TIMs of a group may include TIM information for the group and uplink access control information for the stations of the group. The TIM information may indicate the stations for which the AP 12 has unicast data and other TIM information, such as element ID, length, TIM counts, TIM periods, offset values, range values, etc. A complete TIM PVB for the group may be segmented and distributed in multiple DTIMs and TIMs. Stations in the group may wake up prior to each assigned DTIM and prior to each assigned TIM to check for available data during the assigned DTIMs and TIMs.

Set Bitmap

A set bitmap is similar to a PVB, but with each bit in the bitmap representing a set of STAs. The bit associated to a set is set to 1 if any STA in the set has buffered data. A set bitmap allows stations to quickly determine whether the stations should scan a TIM for more detailed information. A station my scan a TIM for more information when the bit (in the set bitmap) associated to its set is equal to '1'. If the bit (in the set bitmap) associated to its set is not set to '1', the station may quickly return to the standby mode. A station may search a set bitmap to check whether there is any buffered data for the whole set before searching the TIM for its individual buffered data information. A TIM may include one or more set bitmaps. A station may search the appropriate one of the set bitmaps based on a set index within its AID.

Set bitmaps are useful when the AP 12 divides a complete PVB of a group into multiple fragments and sends each of the fragments in a separate DTIM or TIM. Stations that wake up for a DTIM can scan a set bitmap and decide whether to stay awake for subsequent TIMs. Stations associated with sets for which the AP 12 does not have data can return to the standby mode subsequent to the DTIM or TIM if the station does not have uplink data to send.

Additional Uplink Examples

As another example, each DTIM (e.g., the DTIM-1, DTIM-2, DTIM-3 of FIG. 13) may include a group AID, a set bitmap, a set offset value, a set range value, and TIM information for stations in sets granted uplink access. The set bitmap may indicate: the stations in the sets of the associated group for which the AP has data; and which stations in the sets of the associated group that can return to the standby mode. If the set bitmap is not included, all of the stations associated with the group may remain in the active mode until determining each station's buffered data information in the associated TIM segment.

The set offset value and set range value may be provided to indicate the sets of stations granted (i) downlink and uplink access to a channel, or (ii) granted uplink access to the channel. The set offset value may indicate a first set in a sequence of sets. The set range value be indicate a number of sets from the first set for which access is granted. The set range value may be fixed for a current TIM and subsequent TIMs until a next DTIM. This allows stations to predict a TIM subsequent to which the stations have permitted uplink channel access. The set range value can be determined by the AP 12 dynamically prior to each DTIM based on an amount of stations for which the AP 12 has data and a station (unicast) AID distribution. The station AID distribution includes the AIDs of the stations for which the AP 12 has data and separations (or numbers of bits) between these AIDs.

Set offset values may be rotated from a current DTIM or TIM to a next DTIM or TIM to change the stations associated with each DTIM and TIM. This aids in providing equally shared access time for stations to a channel. If the set offset values and set range values are not provided in a DTIM, then all stations in the set associated with the set bitmap or the group associated with the group AID may access the channel subsequent to the DTIM.

In another example, each TIM (e.g., the TIMs of FIG. 13) may include a group AID, a set bitmap, a set offset value, a set range value, and TIM information for stations in sets granted uplink access. The set offset value and the set range value may be provided for uplink access. The set offset value and the set range value may be fixed for TIMs subsequent to a current TIM, such that stations can predict a TIM subsequent to which the granted stations have uplink channel access. Set offset values may be rotated from a current DTIM or TIM to a next DTIM or TIM to change the stations associated with each DTIM and TIM. If the set offset values and set range values are not provided in the TIMs, then all stations in the set associated with the set bitmap or the group associated with the group AID may access the channel subsequent to a DTIM and/or the TIMs.

An AID space may be divided into groups of stations to stagger wake up times for different groups, which staggers uplink channel access times of the different groups. A set bitmap provides stations in a group with information indicating whether there is buffered data at an access point for the stations in the group, such that stations within sets of the group with a set bit of 0 may return to a sleep mode without checking a detailed segmented TIM.

Figure 16:
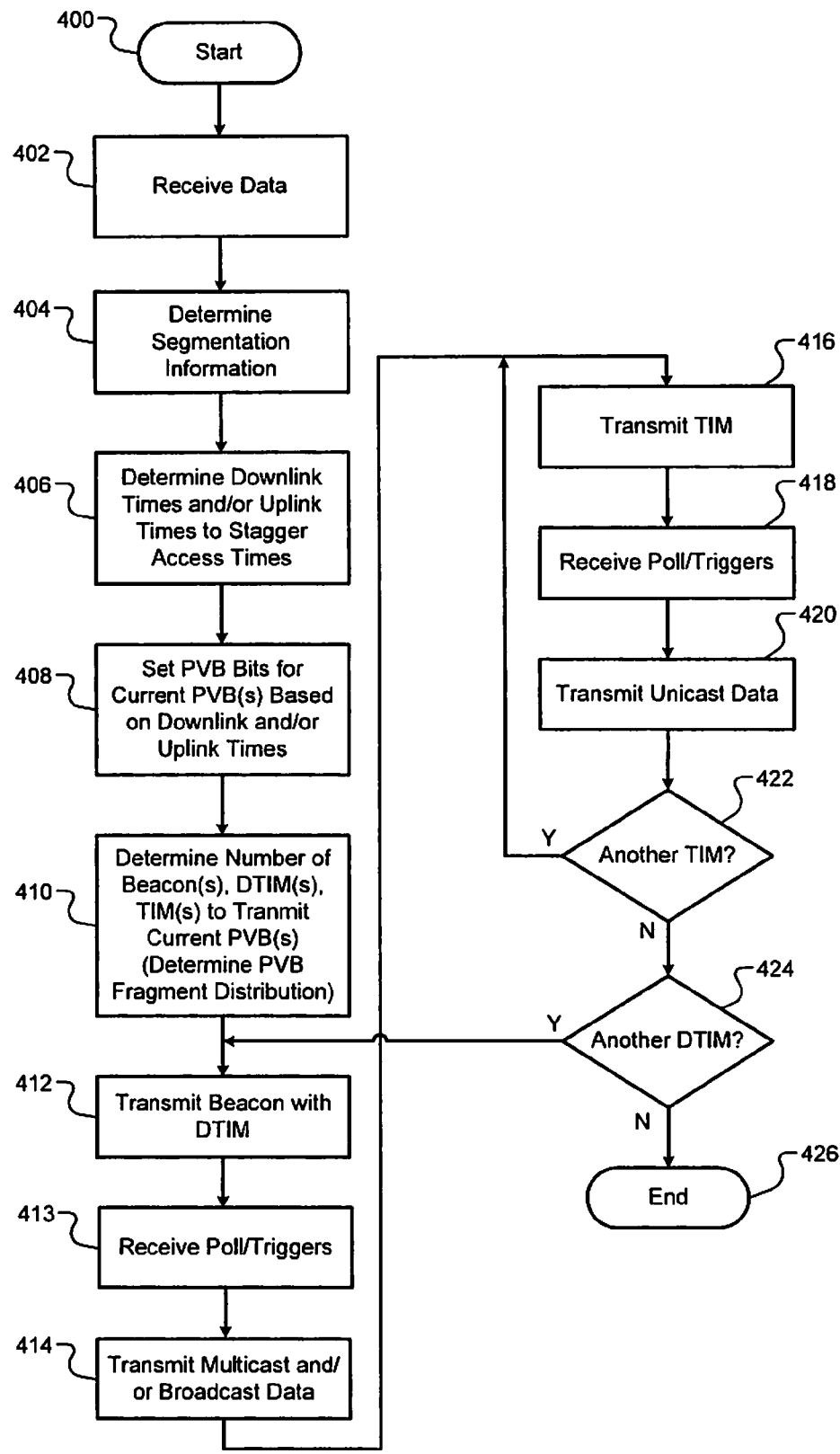
FIG. 16 illustrates an access point channel access allocation method in accordance with the present disclosure.

In FIG. 16, an AP channel access allocation method is provided. Although the following tasks are primarily described with respect to the implementations of FIGS. 1-15, the tasks may be easily modified to apply to other implementations of the present disclosure. The tasks may be iteratively performed. The method may begin at 400.

At 402, the AP 12 and/or AP MAC device 18 receives data for stations. The data may be multicast, broadcast and/or unicast data. At 404, the segmentation module 60 determines segmentation information as determined in the method of FIG. 12.

At 406, the message control module 42, the AP downlink module 46 and/or AP uplink module 41 determines downlink times and/or uplink times to stagger access times of the stations, as described above. The downlink times may be determined to stagger uplink times.

At 408, the PVB control module 54 sets AID bits of one or more PVB(s) based on the downlink times and/or the uplink times. Unicast AID bits may be temporarily set to a LOW or '0' state instead of a High or '1' state when unicast data is available to delay downlink of certain stations.

At 410, the segmentation module 60 and/or message control module 42 may determine a number of beacon(s), DTIM (s), and/or TIM(s) to transmit current PVB(s). This is referred to as determining a fragment distribution. A PVB may be divided into multiple PVBs (or PVB fragments) and distributed among multiple DTIMs and/or TIMs. A PVB may also be divided into multiple report sections (or PVB fragments) and provided in a single DTIM or TIM.

At 412, the AP PHY device 20 transmits a beacon with a DTIM having one or more fragments of the PVB(s). At 413, the AP MAC device 18 via the AP PHY device 20 receives poll or trigger signals from stations in response to the transmitted DTIM. At 414, the AP PHY device 20 transmits multicast and/or broadcast data to the stations.

At 416, the AP PHY device 20 transmits a TIM having one or more fragments of the PVB(s). At 418, the AP MAC device 18 via the AP PHY device 20 receives poll or trigger signals from stations in response to the transmitted TIM. At 420, the AP PHY device 20 transmits unicast data to the stations for which the AP 12 received poll or trigger signals.

At 422, the message control module 42 determines whether there is another TIM to transmit. If there is another TIM to transmit task 416 may be performed, otherwise task 424 may be performed.

At 424, the message control module 42 determines whether there is another DTIM to transmit. If there is another DTIM to transmit task 412 may be performed, otherwise the method may end at 426.

At any time during the method of FIG. 16, tasks 402-410 may be repeated to update segmentation information, PVBs, and a PVB fragment distribution.

Figure 17:
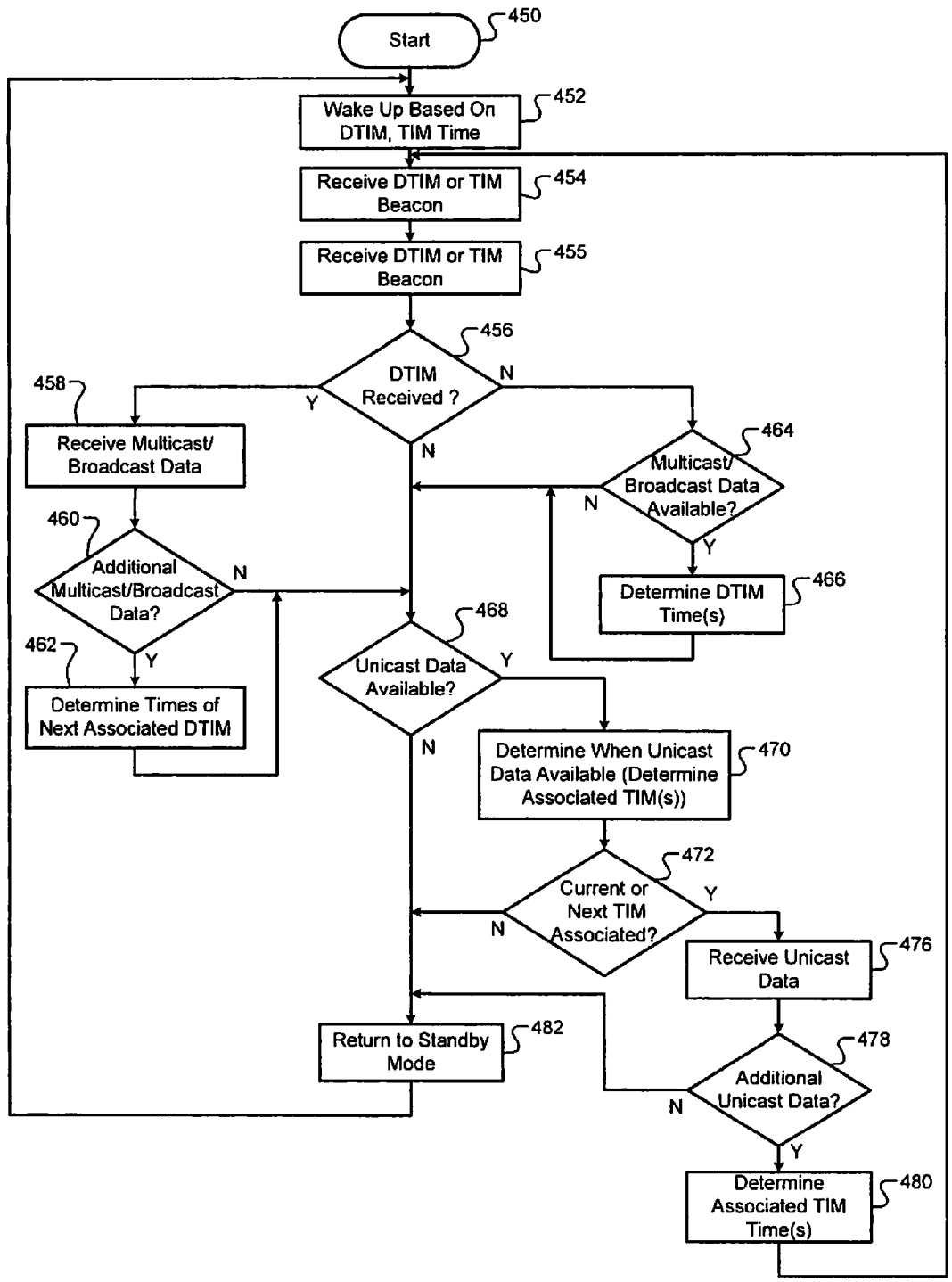
FIG. 17 illustrates a station channel access method in accordance with the present disclosure.

In FIG. 17, a station channel access method is provided. Although the following tasks are primarily described with respect to the implementations of FIGS. 1-16, the tasks may be easily modified to apply to other implementations of the present disclosure. The tasks may be iteratively performed. The method may begin at 450.

At 452, a station (e.g., one of the stations 14) having the station control module 80 wakes up (transitions to the active mode) based on a DTIM or TIM time associated with the station. At 454, the station receives a DTIM or TIM beacon from the AP 12. At 455, the poll module 88 may generate and transmit a poll signal and/or trigger signal via the station PHY device 36 to the AP 12 based on the received DTIM or TIM beacon. The station 14 may receive, for example, a group AID or a unicast AID indicating that there is data available for the station 14 in the DTIM or TIM beacon. The poll module 88 may then poll the AP 12 to receive traffic or remain in the active mode for a duration of the received beacon to receive downlink traffic. The station 14 may wake up prior to a DTIM associated with a group, set, and/or subset in which the station 14 belongs to detect possible transmission of multicast and/or broadcast data.

At 456, the station downlink module 82 may determine whether the station 14 has received a DTIM or a TIM. IF a DTIM is received task 458 may be performed otherwise task 464 may be performed. At 458, the station MAC device 32 received multicast and/or broadcast data.

At 460, the station downlink module 82 and/or the PVB monitoring module 86 may determine based on PVB(s), group information, TIM information, and/or other information received in the beacon at 454 whether there is additional multicast and/or broadcast data for the station 14. The PVB monitoring module 86 may check statuses of reserve ID bits and/or group AID bits in the received PVB(s) to determine if there is additional multicast and/or broadcast data available for the station. If there is additional multicast and/or broadcast data available, task 462 is performed, otherwise task 468 is performed.

At 462, the station downlink module 82 and/or PVB monitoring module 86 may determine transmission times of the next DTIM(s) associated with the station.

At 464, the station downlink module 82 and/or PVB monitoring module 86 may determine from information in the TIM beacon and/or in the TIM whether multicast and/or broadcast data is available. This may be done by reviewing reserve ID bits and/or group AIDs of the TIM received, as described above.

At 466, the station downlink module 82 and/or PVB monitoring module 86 may determine from information in the TIM beacon and/or in the TIM transmission times of the next DTIM(s) associated with the station. Task 468 is performed following task 466

At 468, the PVB monitoring module 86 determines whether unicast data is available for the station 14 by checking status of a unicast AID bit in one or more of the received PVB(s). If unicast data is available task 470 may be performed, otherwise task 482 may be performed.

At 470, the station downlink module 82 and/or PV8 monitoring module 86 may, if not already determined, determine times of TIMs associated with the station 14 to determine when the unicast data is to be downlinked to the station 14.

At 472, the station downlink module 82 may determine whether the current TIM or next TIM is associated with the station 14. If the current TIM or next TIM is associated with the station, task 476 may be performed, otherwise task 482 may be performed.

At 476, the station 14 remains in the active mode and receives unicast data. At 478, the station downlink module 82 and/or the PVB monitoring module 86 may determine whether there is additional unicast data to be received. This decision may be based on unicast AID(s) in the PVB(s) associated with the station 14 and/or based on other information received in the beacon, such as additional TIM times.

At 480, the station downlink module 82 and/or PVB monitoring module 86 may, if not already determined, determine times of TIMs associated with the station 14 to determine when the additional unicast data is to be downlinked to the station 14. Task 454 may be performed subsequent to task 480. At 482, the station control module 80 of the station 14 may return to the standby mode. Task 452 may be performed subsequent to task 482.

The above-described tasks of FIGS. 16 and 17 are meant to be illustrative examples; the tasks may be performed sequentially, synchronously, simultaneously, continuously, during overlapping time periods or in a different order depending upon the application. Also, any of the tasks may not be performed or skipped depending on the implementation and/or sequence of events.

The above described networks, systems, access points, stations, and methods may satisfy IEEE standards, such as 802.11, 802.11a, 802.11b, 802.11g, 802.11ah, 802.11h, 802.11n, 802.16, and 802.20.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

What is claimed is:

1. A system comprising:
a medium access control device configured to receive data for N of M stations, wherein the received data is to be transmitted from an access point to the N stations, wherein the M stations are associated with the access point, and where N is greater than or equal to one and is less than or equal to M, and wherein the medium access control device comprises
a multicast module configured to (i) determine whether the received data includes first data, and (ii) determine to which one or more groupings of the M stations the access point is to transmit the first data,
a unicast module configured to (i) determine whether the received data includes second data, and (ii) determine to which ones of the N stations the access point is to transmit the second data,
a bitmap module configured to generate a partial virtual bitmap including (i) at least one first identifier for the one or more groupings of the M stations, and (ii) second identifiers for the ones of the N stations, wherein the at least one first identifier indicates for the access point identifiers of groups of the M stations, identifiers of sets of the groups, identifiers of subsets of the sets, and identifiers of the N stations,
a segmentation module configured to (i) generate segmentation information indicating whether to divide the partial virtual bitmap into a plurality of fragments, (ii) fragment the partial virtual bitmap based on a fragment distribution, and (iii) determine the fragment distribution based on a number of the groups, a number of the sets, a number of the subsets, and a number of the N stations in each of the subsets, and
a message control module configured to transmit at least one traffic information message to one or more of the N stations based on the segmentation information, wherein the traffic information message indicates bit states of the at least one first identifier and the second identifiers.

2. The system of claim 1, wherein:
the one or more first identifiers and the second identifiers have a first state;
the partial virtual bitmap includes third identifiers for which data has not been provided; and
the third identifiers have a second state different than the first state and are in numerical order between (i) the one or more first identifiers and (ii) the second identifiers.

3. The system of claim 1, wherein:
the first data includes multicast data or broadcast data; and
the second data includes unicast data.

4. The system of claim 1, wherein:
the medium access control device is configured to transmit beacons;
the at least one traffic information message comprises a plurality of traffic information messages, wherein each of the beacons includes a respective one of the plurality of traffic information messages; and
the segmentation information indicates a distribution of the plurality of fragments over the plurality of traffic information messages.

5. The system of claim 1, wherein the segmentation information comprises:
a number of the at least one traffic information message into which to divide the partial virtual bitmap;
information identifying which ones of the at least one first identifier to include in each of the at least one traffic information message;
information identifying which ones of the second identifiers to include in each of the at least one traffic information message;
a number of report sections into which to divide the partial virtual bitmap; and
a number of the report sections to include in each of the at least one traffic information message.

6. The system of claim 1, further comprising:
an offset module configured to determine offset values for each of the plurality of fragments; and
a range module configured to determine a range value corresponding to each of the offset values, wherein the segmentation information includes the offset values and the range values.

7. The system of claim 1, wherein:
the at least one traffic information message comprises a first traffic information message and a second traffic information message;
the first traffic information message comprises a first fragment of the partial virtual bitmap;
the second traffic information message comprises a second fragment of the partial virtual bitmap; and
the medium access control device comprises a message information module, wherein the message information module is configured to determine an element identifier, a length, a count, and a period for each of the first fragment and the second fragment.

8. The system of claim 7, wherein:
the element identifiers identify the first traffic information message and the second traffic information message;
the lengths identify lengths of the first fragment and the second fragment;
the counts identify a number of traffic information messages; and
the periods identify a traffic indication interval.

9. The system of claim 1, further comprising a group module configured to determine group information including a size and identifier lengths of the plurality of fragments,
wherein the medium access control device generates beacons comprising at least one traffic information message and the group information.

10. The system of claim 1, wherein:
the segmentation module is configured to divide the partial virtual bitmap into a first partial virtual bitmap and a second partial virtual bitmap;
the first partial virtual bitmap comprises the at least one first identifier and a first portion of the second identifiers; and
the second partial virtual bitmap comprises a second portion of the second identifiers.

11. The system of claim 10, further comprising an offset module configured to (i) generate a first offset value for the first partial virtual bitmap, and (ii) a second offset value for the second partial virtual bitmap,
wherein the at least one traffic information message comprises a single traffic information message including the first offset, the first partial virtual bitmap, the second offset value, and the second partial virtual bitmap.

12. The system of claim 1, wherein:
the at least one first identifier comprises identifiers for first groupings of the M stations and identifiers for second groupings of the M stations;
the segmentation module is configured to divide the partial virtual bitmap into a first partial virtual bitmap and a second partial virtual bitmap;
the first partial virtual bitmap comprises the identifiers for the first groupings and a first portion of the second identifiers;
the second partial virtual bitmap comprises the identifiers for the second groupings and a second portion of the second identifiers; and
the at least one traffic information message comprises a single traffic information message including the first partial virtual bitmap and the second partial virtual bitmap.

13. The system of claim 1, further comprising an offset module configured to generate offset values, wherein:
the partial virtual bitmap has only a single one of the offset values;
the segmentation module is configured to divide the partial virtual bitmap into a plurality of partial virtual bitmaps;
each of the plurality of partial virtual bitmaps comprises one of the at least one first identifier and a portion of the second identifiers;
the offset value is applicable to each of the plurality of partial virtual bitmaps; and
the at least one traffic information message comprises a single traffic information message including the offset value and the plurality of partial virtual bitmaps.

14. The system of claim 1, further comprising an offset module configured to generate offset values, wherein:
the partial virtual bitmap has only a single one of the offset values;
the segmentation module determines not to segment the partial virtual bitmap; and
the at least one traffic information message includes only a single traffic information message.

15. The system of claim 14, wherein the single one of the offset values comprises a plurality of bytes of information.

16. The system of claim 1, wherein:
the at least one traffic information message comprises a plurality of traffic information messages; and
each of the plurality of traffic information messages comprises at least one fragment of the partial virtual bitmap.

17. The system of claim 1, further comprising:
an offset module configured to generate offset values, each offset value corresponding to a different report section of the at least one traffic information message;
a range module configured to generate range values, each range value corresponding to one of the offset values; and
a beacon module configured to generate a beacon comprising the at least one traffic information message,
wherein the segmentation module is configured to determine a number of report sections into which to divide the partial virtual bitmap, and
wherein the beacon comprises the offset values, the range values and the report sections.

18. The system of claim 1, wherein the fragment distribution indicates:
a number of report sections and a number of the at least one traffic information messages into each of which to distribute one or more of the plurality of fragments of the partial virtual bitmap, and
into which ones of the report sections and the at least one traffic information messages to include one or more of the plurality of fragments of the partial virtual bitmap.

19. The system of claim 1, wherein each of the groups includes a corresponding number of the sets.

20. The system of claim 1, further comprising a group module configured to determine group information, wherein:
the group information includes the number of groups, the number of sets, the number of the subsets, and the number of the N stations per each of the subsets;
the medium access control device is configured to generate a first beacon;
the first beacon comprises a first traffic information message and the group information; and
the at least one traffic information message includes the first traffic information message.

21. The system of claim 20, wherein:
the medium access control device is configured to generate a second beacon;
the second beacon comprises a second traffic information message and the group information; and the at least one traffic information message includes the second traffic information message.

22. A system comprising:

a medium access control device configured to receive data for N of M stations, wherein the received data is to be transmitted from an access point to the N stations, wherein the M stations are associated with the access point, and where N is greater than or equal to one and is less than or equal to M, and wherein the medium access control device comprises a multicast module configured to (i) determine whether the received data includes first data, and (ii) determine to which one or more groupings of the M stations the access point is to transmit the first data, a unicast module configured to (i) determine whether the received data includes second data, and (ii) determine to which ones of the N stations the access point is to transmit the second data, a bitmap module configured to generate a partial virtual bitmap including (i) at least one first identifier for the one or more groupings of the M stations, and (ii) second identifiers for the ones of the N stations, a segmentation module configured to generate segmentation information indicating whether to divide the partial virtual bitmap into a plurality of fragments, and a message control module configured to transmit a plurality of traffic information messages to one or more of the N stations based on the segmentation information, wherein the traffic information message indicates bit states of the at least one first identifier and the second identifiers, wherein the medium access control device is configured to transmit beacons, each of the beacons includes a respective one of the plurality of traffic information messages, and the segmentation information indicates a distribution of the plurality of fragments over the plurality of traffic information messages.

23. The system of claim 22, wherein:

the at least one first identifier indicates for the access point identifiers of groups of the M stations, identifiers of sets of the groups, identifiers of subsets of the sets, and identifiers of the N stations; and the segmentation module is configured to (i) fragment the partial virtual bitmap based on a fragment distribution, and (ii) determine the fragment distribution based on a number of the groups, a number of the sets, a number of the subsets, and a number of the N stations in each of the subsets.

\* \* \* \* \*